US006984175B2

(12) United States Patent
Nguyen et al.

(10) Patent No.: US 6,984,175 B2
(45) Date of Patent: Jan. 10, 2006

(54) ELECTRONIC PAYOUT ADMINISTRATION METHOD AND SYSTEM

(75) Inventors: Binh T. Nguyen, Reno, NV (US);
Craig A. Paulsen, Reno, NV (US);
Michael T. B-Jensen, Reno, NV (US)

(73) Assignee: IGT, Reno, NV (US)

( * ) Notice: Subject to any disclaimer, the term of this patent is extended or adjusted under 35 U.S.C. 154(b) by 256 days.

(21) Appl. No.: 10/085,779

(22) Filed: Feb. 28, 2002

(65) Prior Publication Data

US 2003/0162589 A1 Aug. 28, 2003

(51) Int. Cl.
*A63F 9/24* (2006.01)
*G06F 17/60* (2006.01)

(52) U.S. Cl. .............................. 463/25; 705/31; 705/19
(58) Field of Classification Search ..................... 463/1, 463/9–13, 16–20, 25–30, 36, 40–44; 700/91–93; 705/1, 30–31, 19; 235/375, 380–382; 379/93.13; 273/292–293, 236–237, 269, 143 R; 340/5.52, 340/5.82; 382/115, 118; 713/186
See application file for complete search history.

(56) References Cited

U.S. PATENT DOCUMENTS

| 5,326,104 | A |   | 7/1994  | Pease et al. ................. | 273/138 |
|-----------|---|---|---------|--------------------------------|---------|
| 5,505,461 | A |   | 4/1996  | Bell et al. .................... | 273/433 |
| 6,001,016 | A |   | 12/1999 | Walker et al. ................ | 463/42  |
| 6,210,279 | B1|   | 4/2001  | Dickinson                      |         |
| 6,312,333 | B1|   | 11/2001 | Acres                          |         |
| 6,612,928 | B1| * | 9/2003  | Bradford et al. .............. | 463/29  |
| 6,681,984 | B2|   | 1/2004  | Brunner ....................... | 235/375 |

FOREIGN PATENT DOCUMENTS

| WO | WO 01/25992 | 4/2001  |
|----|-------------|---------|
| WO | WO 01/91075 | 11/2001 |
| WO | WO 01/91866 | 12/2001 |
| WO | WO 02/21370 | 3/2002  |

OTHER PUBLICATIONS

Kiplinger Tax Cut for Federal Tax Year 1999 released Jan. 2000, photocopy of box including front, back, side and open flaps (5 pages).*

'Using the Internet to File Your Taxes', by C. A. Holt and Source Page for Year 2000 Links for Tax Do–It–Yourselfers: Using the Internet to File Your Taxes showing published Jan. 19, 2001 and last updated 26/01.*

'The Tax Man Cometh', at CasinoGaming.com, Part I and Part II, 9 pages, undated.*

Taxable and Nontaxable Income, including gambling gain/loss from Publication 525 from IRS.gov, 71 pages (specifically, see 59 for gambling).*

Behrman et al., "The Case of the Invisible Ink: E–Signatures", Customer Interaction vol. 4, Brief 6, pp. 1–11 (Dec. 21, 2000).

"Electronic Signature Capture for E–Commerce & Emerging Internet Applications", ePad (Apr. 6, 1999).

(Continued)

*Primary Examiner*—Mark Sager
(74) *Attorney, Agent, or Firm*—Marshall, Gerstein & Borun LLP

(57) ABSTRACT

A payout administration method including retrieving an electronic form selected according to a location of a gaming apparatus adapted to receive a wager from a player and to provide a payout based on the wager and a game outcome, retrieving stored data about the gaming apparatus or the player, and combining the electronic form and the stored data to generate a completed electronic form. Also provided are a payout administration system and apparatus which operate according to the payout administration method.

26 Claims, 15 Drawing Sheets

OTHER PUBLICATIONS

"Electronic signature capture is taking the computer world by storm for the basic reason of reducing costly paper. Integrate OrionSign into your application today and you'll be capturing signatures tomorrow!" OrionSign (Aug. 6, 2001).

"Sign and Your Signature Is Valid. Anywhere." CIC Products (Aug. 6, 2001).

"40% of people change their buying decision by the time a contact is mailed to them for signing." Silanis (Aug. 8, 2001).

"AlphaTrust PRONTO", AlphaTrust (Aug. 6, 2001).

"E–signatures: handwriting on the wall." Red Herring pp. 43 (Sep. 2000).

E–Lock Technologies.

International Search Report (counterpart PCT application).

* cited by examiner

US 6,984,175 B2

ELECTRONIC PAYOUT ADMINISTRATION METHOD AND SYSTEM

BACKGROUND

This patent is directed to a payout administration method and system, and, in particular, to an electronic payout administration method and system.

The gaming industry is subject to regulation by numerous federal, state and local agencies. For example, those states that permit gaming typically provide extensive agency oversight of gaming system operators and over the gaming experience. Additionally, because the gaming industry handles and transfers sizable amounts of value, for example, in the form of coin, paper currency, and electronic media, federal, state and local taxing agencies are interested in accurate reporting of the value transfers involved.

As a consequence of the significant agency oversight, gaming system operators are responsible for completing and forwarding a variety of forms to numerous agencies, for example, when a player hits a jackpot on a gaming machine. The gaming system operator must submit forms to the state and local agencies that regulate gaming to verify the proper operation of the gaming machine involved. Typically, the forms that must be submitted vary from jurisdiction to jurisdiction, and more than one jurisdiction may be involved. In addition, there are federal, local, and state income tax forms that must be filled out and filed with the correct corresponding agencies. These income tax forms also typically vary by jurisdiction, and numerous jurisdictions may be involved.

To comply with the foregoing, employees of the gaming system operator must select the appropriate forms, and ensure that the forms are up to date. Additionally, the employees must gather data from the winning player and from the gaming machine that determined that a jackpot should be awarded. The employees must then fill out the forms completely, and obtain the player's signature, where appropriate. The employees must then make multiple copies of the forms, and distribute the correct number of the proper forms to the appropriate parties, i.e, the player, the involved agencies, the gaming machine manufacturer, the internal gaming system operator compliance officials, etc. Typically, the gaming system operator requires at least two trained gaming system employees to completely fill out the forms. A jackpot representative selects the forms, gathers the player's data, and fills out, copies and distributes the forms. A gaming machine technician is required to gather the data from the gaming machine.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, it is not intended that the scope of any claim element be interpreted based on the application of 35 U.S.C. § 112, sixth paragraph.

Figure 1:
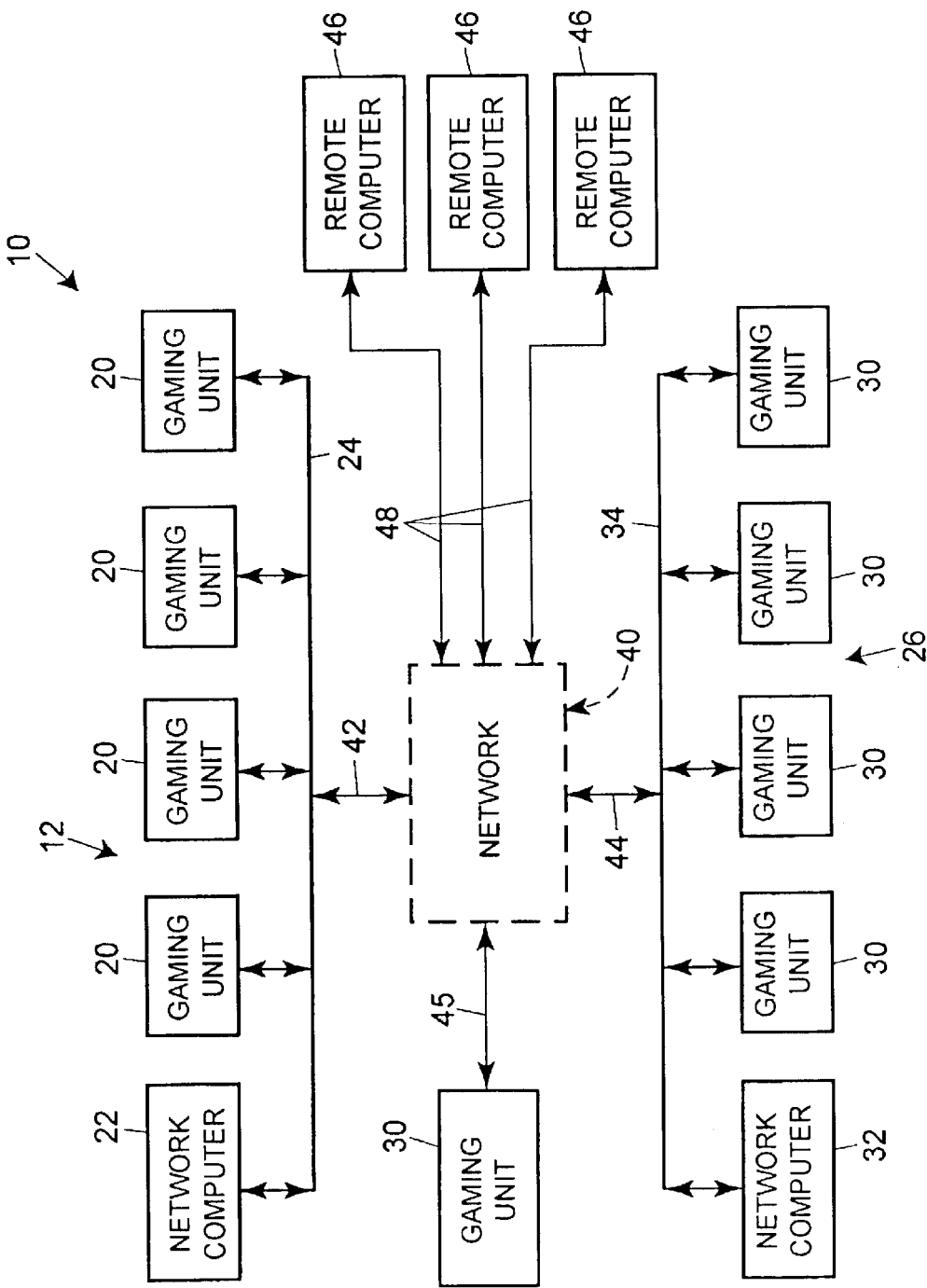
FIG. 1 is a block diagram of an embodiment of a gaming system in accordance with the invention.

FIG. 1 illustrates an embodiment of a gaming system 10. Referring to FIG. 1, the gaming system 10 may include a first group or network 12 of one or more gaming units 20 that may be operatively coupled to a network computer 22 via a network data link or bus 24. The gaming system 10 may include a second group or network 26 of one or more gaming units 30 that may be operatively coupled to a network computer 32 via a network data link or bus 34. The first and second gaming networks 12, 26, may be operatively coupled to each other via a network 40 and network links 42, 44, and one or more of the gaming units 20, 30 (gaming units 30 as shown) may be operatively coupled to the respective group 12, 26 via the network 40 and network links 45. The network 40 may also be connected to one or more remote computers 46 of one or more federal, state, and/or local agencies, the gaming unit manufacturer, and/or the system operator by network links 48. The network 40 may comprise, for example, the Internet, an intranet, a wide area network (WAN), or a local area network (LAN).

The first network 12 of gaming units 20 may be provided in a first geographic location, and the second network 26 of gaming units 30 may be provided in other geographic locations than the first geographic location. For example, the gaming units 20, 30 may be located in different areas of the same building, city, state or country. Similarly, the remote computers 46 may be disposed in a different geographic location than the networks 12, 26, and in particular the network computers 22, 32, such as in a different city, state or country or simply in a different location in the same building. The network 40 may include a plurality of network computers or server computers (not shown), each of which may be operatively interconnected. Where the network 40 comprises the Internet, data communication may take place over the communication links 42, 44, 45 and 48 via an Internet communication protocol.

The network computer 22 may be a server computer and may be used to accumulate and analyze data relating to the operation of the gaming units 20. For example, the network computer 22 may continuously receive data from each of the gaming units 20 indicative of the dollar amount and number of wagers being made on each of the gaming units 20, data indicative of how much each of the gaming units 20 is paying out in winnings, data regarding the identity and gaming habits of players playing each of the gaming units 20, etc. The network computer 32 may be a server computer and may be used to perform the same or different functions in relation to the gaming units 30 as the network computer 22 described above.

Although each network 12, 26 is shown to include one network computer 22, 32 and four to six gaming units 20, 30, it should be understood that different numbers of computers and gaming units may be utilized. For example, the networks 12, 26 may include tens or hundreds of network computers 22, 32 and tens or hundreds of gaming units 20, 30, all of which may be interconnected via the data links 24, 34. The data links 24, 34 (as well as network links 42, 44, 45, 48) may be dedicated hardwired links, optical links or wireless links. Although the data links 24, 34 (42, 44, 45, 48) are shown as single data links, the data links 24, 34 (42, 44, 45, 48) may comprise multiple data links. As another alternative, a peer-to-peer network may be used, in which case there would be no need for the network computers 22, 32 because the gaming units 20, 30 would instead share the processing handled by the network computers 22, 32 in the gaming system 10 as illustrated.

Gaming Unit

Each gaming unit 20, 30 may be any type of gaming unit and may have various different structures and methods of operation. For example, in addition to the embodiments discussed below, the gaming unit 20, 30 may include a computer (personal computer or laptop), a Personal Digital Assistant (PDA) and/or a cellular phone. Thus, while various designs of the gaming units 20 are described below, it should be recognized that numerous other designs may be utilized.

Figure 2:
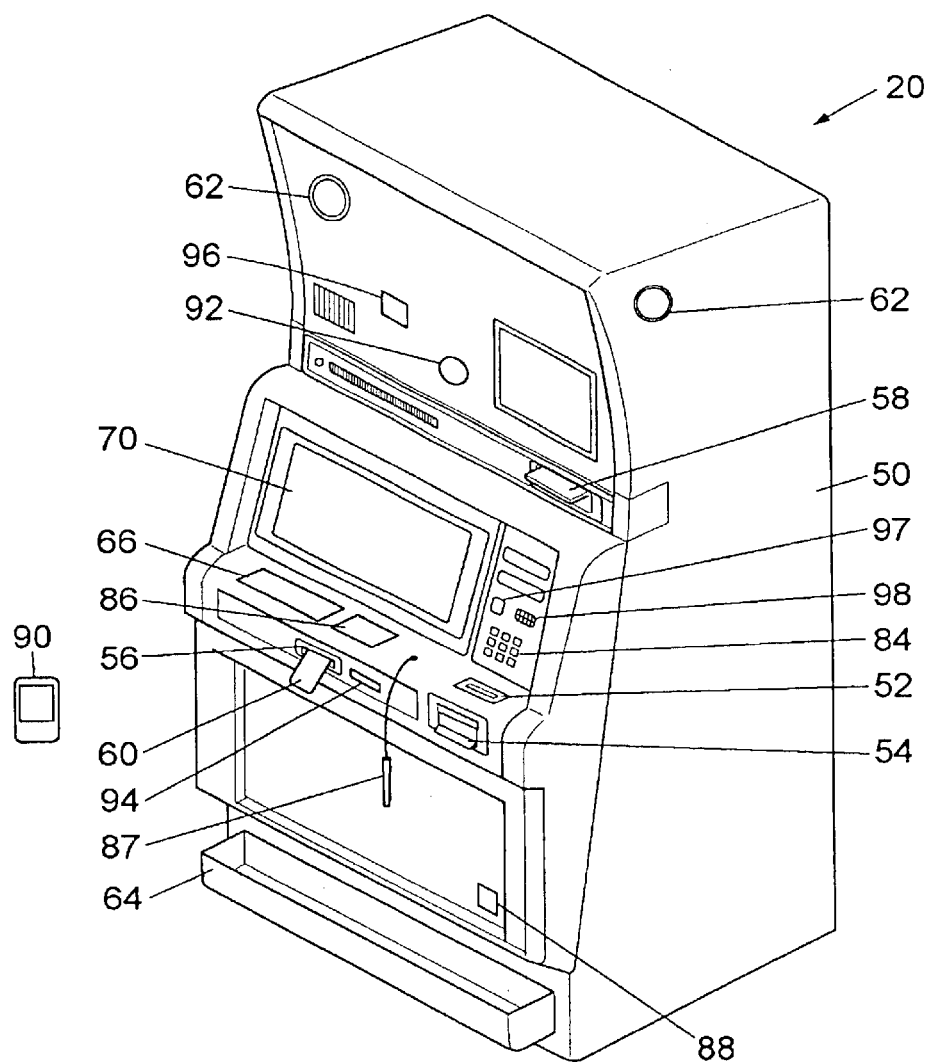
FIG. 2 is a perspective view of an embodiment of one of the gaming units shown schematically in FIG. 1.

FIG. 2 is a perspective view of one possible embodiment of one or more of the gaming units 20. Although the following description addresses the design of the gaming units 20, it should be understood that the gaming units 30 may have the same design as the gaming units 20 described below. It should be understood that the design of one or more of the gaming units 20 may be different than the design of other gaming units 20, and that the design of one or more of the gaming units 30 may be different than the design of other gaming units 30.

Referring to FIG. 2, the gaming unit 20 may include a housing or cabinet 50 and one or more input devices, which may include a coin slot or acceptor 52, a paper currency or bill acceptor 54, a ticket reader/printer 56 and a card reader 58, which may be used to input value to the gaming unit 20. A value input device may include any device that can accept value from a customer. As used herein, the term "value" may encompass money denominations or credits, and may be in the form of gaming tokens, coins, paper currency, ticket vouchers, electronic vouchers (stored, for example, on a card or PDA (Personal Digital Assistant)), credit or debit cards, and any other object representative of value.

If provided on the gaming unit 20, the ticket reader/printer 56 may be used to read and/or print or otherwise encode ticket vouchers 60. The ticket vouchers 60 may be composed of paper or another printable or encodable material and may have one or more of the following informational items printed or encoded thereon: the casino name, the type of ticket voucher, a validation number, a bar code with control and/or security data, the date and time of issuance of the ticket voucher, redemption instructions and restrictions, a description of an award, and any other information that may be necessary or desirable. Different types of ticket vouchers 60 could be used, such as bonus ticket vouchers, cash-redemption ticket vouchers, casino chip ticket vouchers, extra game play ticket vouchers, merchandise ticket vouchers, restaurant ticket vouchers, show ticket vouchers, etc. The ticket vouchers 60 could be printed with an optically readable material such as ink, or data on the ticket vouchers 60 could be magnetically encoded. The ticket reader/printer 56 may be provided with the ability to both read and print ticket vouchers 60, or it may be provided with the ability to only read or only print or encode ticket vouchers 60. In the latter case, for example, some of the gaming units 20 may have ticket printers 56 that may be used to print ticket vouchers 60, which could then be used by a player in other gaming units 20 that have ticket readers 56.

If provided, the card reader 58 may include any type of card reading device, such as a magnetic card reader or an optical card reader, and may be used to read data from a card offered by a player, such as a credit card or a player tracking card. If provided for player tracking purposes, the card reader 58 may be used to read data from, and/or write data to, player tracking cards that are capable of storing data representing the identity of a player, the identity of a casino, the player's gaming habits, etc.

The gaming unit 20 may include one or more audio speakers 62, a coin payout tray 64, an input control panel 66, and a color video display unit 70 for displaying images relating to the game or games provided by the gaming unit 20. The audio speakers 62 may generate audio representing sounds such as the noise of spinning slot machine reels, a dealer's voice, music, announcements or any other audio related to a game. The input control panel 66 may be provided with a plurality of pushbuttons or touch-sensitive areas that may be pressed by a player to select games, make wagers, make gaming decisions, etc.

Figure 2A:
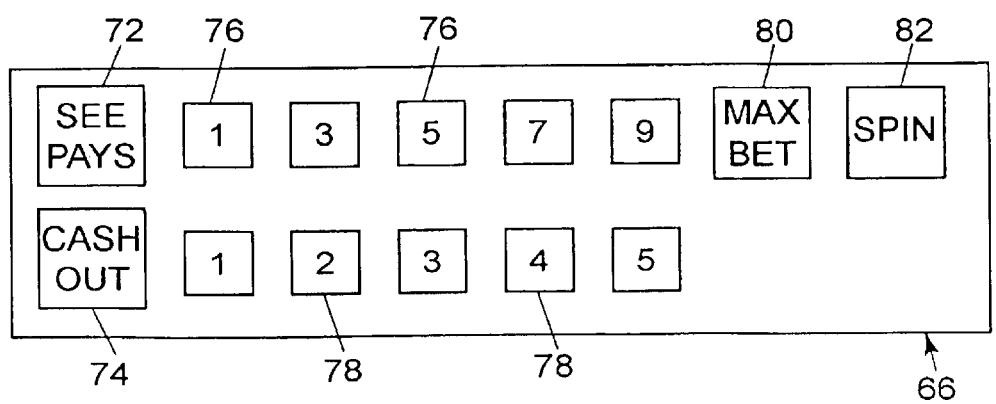
FIG. 2A illustrates an embodiment of a control panel for a gaming unit.

FIG. 2A illustrates one possible embodiment of the control panel 66, which may be used where the gaming unit 20 is a slot machine having a plurality of mechanical or "virtual" reels. Referring to FIG. 2A, the control panel 66 may include a "See Pays" button 72 that, when activated, causes the display unit 70 to generate one or more display screens showing the odds or payout information for the game or games provided by the gaming unit 20. As used herein, the term "button" is intended to encompass any device that allows a player to make an input, such as an input device that must be depressed to make an input selection or a display area that a player may simply touch. The control panel 66 may include a "Cash Out" button 74 that may be activated when a player decides to terminate play on the gaming unit 20, in which case the gaming unit 20 may return value to the player, such as by returning a number of coins to the player via the payout tray 64.

If the gaming unit 20 provides a slots game having a plurality of reels and a plurality of paylines which define winning combinations of reel symbols, the control panel 66 may be provided with a plurality of selection buttons 76, each of which allows the player to select a different number of paylines prior to spinning the reels. For example, five buttons 76 may be provided, each of which may allow a player to select one, three, five, seven or nine paylines.

If the gaming unit 20 provides a slots game having a plurality of reels, the control panel 66 may be provided with a plurality of selection buttons 78 each of which allows a player to specify a wager amount for each payline selected. For example, if the smallest wager accepted by the gaming unit 20 is a quarter ($0.25), the gaming unit 20 may be provided with five selection buttons 78, each of which may allow a player to select one, two, three, four or five quarters to wager for each payline selected. In that case, if a player were to activate the "5" button 76 (meaning that five paylines were to be played on the next spin of the reels) and then activate the "3" button 78 (meaning that three coins per payline were to be wagered), the total wager would be $3.75 (assuming the minimum bet was $0.25).

The control panel 66 may include a "Max Bet" button 80 to allow a player to make the maximum wager allowable for a game. In the above example, where up to nine paylines were provided and up to five quarters could be wagered for each payline selected, the maximum wager would be 45 quarters, or $11.25. The control panel 66 may include a spin button 82 to allow the player to initiate spinning of the reels of a slots game after a wager has been made.

In FIG. 2A, a rectangle is shown around the buttons 72, 74, 76, 78, 80, 82. It should be understood that the rectangle simply designates, for ease of reference, an area in which the buttons 72, 74, 76, 78, 80, 82 may be located. Consequently, the term "control panel" should not be construed to imply that a panel or plate separate from the housing 50 of the gaming unit 20 is required, and the term "control panel" may encompass a plurality or grouping of player activatable buttons.

Although one possible control panel 66 is described above, it should be understood that different buttons could be utilized in the control panel 66, and that the particular buttons used may depend on the game or games that could be played on the gaming unit 20. Although the control panel 66 is shown to be separate from the display unit 70, it should be understood that the control panel 66 could be generated by the display unit 70. In that case, each of the buttons of the control panel 66 could be a colored area generated by the display unit 70, and some type of mechanism may be associated with the display unit 70 to detect when each of the buttons was touched, such as a touch-sensitive screen.

As noted above, the gaming unit 20 may include a mechanism by which the gaming unit 20 may determine the identity of the player. In particular, the card reader 58 may be used to read a card that carries an identification code that may be uniquely associated with the player so that the gaming unit can differentiate that player from all other players, or so that the gaming unit can differentiate that player as a member of a group of players from all player not a member of the group of players. The gaming unit 20 may also include equipment, such as a keypad 84, an input pad 86 (with optional stylus 87), a port (or antenna) 88 adapted to communicate via a wired or wireless link (infrared or radio frequency link, for example) to a Personal Digital Assistant (PDA) 90, a camera 92, a scanner 94, a retinal (or iris) scanner 96, fingerprint scanner 97, and/or a microphone 98. The gaming unit 20 may include any one of the devices 58, 84, 86, 88, 90, 92, 94, 96, 97, 98, or the gaming unit 20 may include a combination of some or all of the devices 58, 84, 86, 87, 88, 90, 92, 94, 96, 97, 98.

In operation, a player may identify him or herself to the gaming unit 20 by entering a unique numeric or alphanumeric code using the key pad 84, for example. Alternatively, the player may use his or her finger or the stylus 87 to sign his or her signature on the input pad 86. The pad 86 and/or stylus 87 may include instrumentation to record such characteristics as position, form, speed, and/or pressure as the player signs his or her signature. As a further alternative, the player may sign his or her signature on the Personal Digital Assistant 90, which signature is then converted to electronic data, and the data is then transferred via the port/antenna 88 to the gaming unit 20. As yet another alternative, the player may sign his or her signature on a piece of paper that is then photographed using the camera 92 or scanned using the scanner 94 (or the bill acceptor 54) to convert the signature into electronic data. As an additional alternative, the player may place one of his or her fingers or his or her hand on the scanner 97, and the scanner 97 may generate an electronic data representation of the fingerprint on one or more of the player's fingers or an electronic data representation of the pattern of the entire hand. Alternatively, the camera 92 may be used to take a picture (live or still) of the player, the picture then being converted into electronic data. As a still further alternative, the player may place his or her eye up to the retinal (or iris) scanner 96, and the retinal (or iris) scanner 96 may generate an electronic data representation corresponding to the pattern of the retina (or iris) of the player. As yet another alternative, the player may speak into the microphone 98, and characteristics of the spoken words (or voiceprint) may be converted into an electronic data representation.

Other equipment may also be used in conjunction with the identification equipment 84, 86, 88, 90, 92, 94, 96, 97, 98. For example, rather than using a stylus 87, a mouse or glove may be used. Additionally, thermal imaging equipment may be included or substituted. Moreover, a touchscreen may be integrated with the display unit 70 and used, in place of the input pad 86, in combination with a stylus or a finger, for example.

Gaming Unit Electronics

Figure 3:
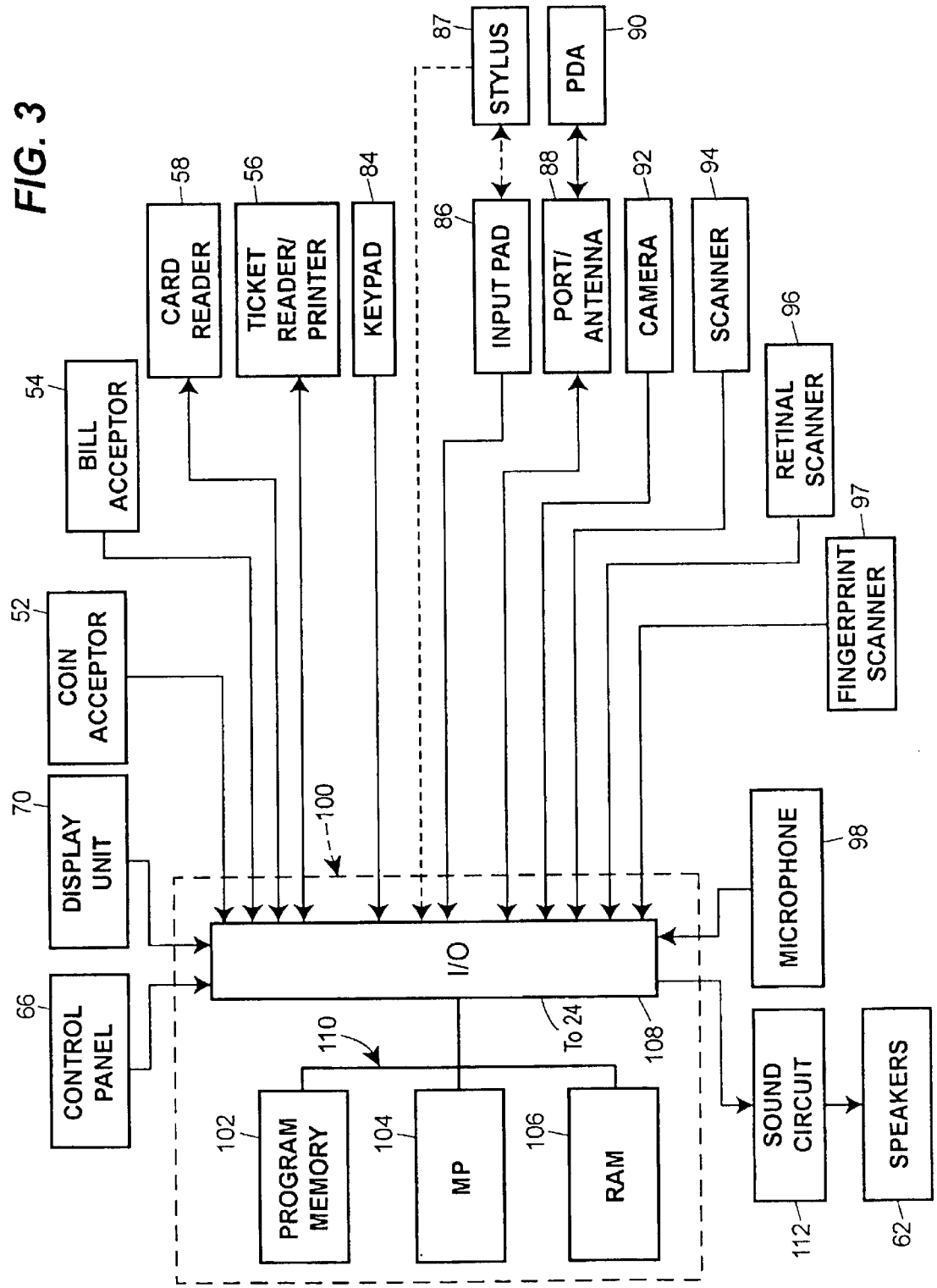
FIG. 3 is a block diagram of the electronic components of the gaming unit of FIG. 2.

FIG. 3 is a block diagram of a number of components that may be incorporated in the gaming unit 20. Referring to FIG. 3, the gaming unit 20 may include a controller 100 that may comprise a program memory 102, a microcontroller or microprocessor (MP) 104, a random-access memory (RAM) 106 and an input/output (I/O) circuit 108, all of which may be interconnected via an address/data bus 110. It should be appreciated that although only one microprocessor 104 is shown, the controller 100 may include multiple microprocessors 104. Similarly, the memory of the controller 100 may include multiple RAMs 106 and multiple program memories 102. Although the I/O circuit 108 is shown as a single block, it should be appreciated that the I/O circuit 108 may include a number of different types of I/O circuits. The RAM(s) 104 and program memories 102 may be implemented as semiconductor memories, magnetically readable memories, and/or optically readable memories, for example.

FIG. 3 illustrates that the coin acceptor 52, the bill acceptor 54, the ticket reader/printer 56, the card reader 58, the control panel 66, the display unit 70, the keypad 84, the input pad 86 (and optionally the stylus 87), the port/antenna 88, the digital camera 92, the scanner 94, the retinal scanner 96, the fingerprint scanner 97 and the microphone 98 may be operatively coupled to the I/O circuit 108, each of those components being so coupled by either a unidirectional or bidirectional, single-line or multiple-line data link, which may depend on the design of the component that is used. The speaker(s) 62 may be operatively coupled to a sound circuit 112, that may comprise a voice- and sound-synthesis circuit or that may comprise a driver circuit. The sound-generating circuit 112 may be coupled to the I/O circuit 108.

As shown in FIG. 3, the components 52, 54, 56, 58, 66, 70, 84, 86, (87), 88, 92, 94, 96, 97, 98, 112 may be connected to the I/O circuit 108 via a respective direct line or conductor. Different connection schemes could be used. For example, one or more of the components shown in FIG. 3 may be connected to the I/O circuit 108 via a common bus or other data link that is shared by a number of components. Furthermore, some of the components may be directly connected to the microprocessor 104 without passing through the I/O circuit 108.

Main Routine

One manner in which one or more of the gaming units 20 (and one or more of the gaming units 30) may operate is described below in connection with a number of flowcharts which represent a number of portions or routines of one or more computer programs, which may be stored in one or more of the memories of the controller 100. The computer program(s) or portions thereof may be stored remotely, outside of the gaming unit 20, and may control the operation of the gaming unit 20 from a remote location (e.g., random number generation may occur remote to the gaming unit 20). Such remote control may be facilitated with the use of a wireless connection, or by an Internet interface that connects the gaming unit 20 with a remote computer (such as one of the network computers 22, 32) having a memory in which the computer program portions are stored. By storing the computer program portions therein, various portions of the memories 102, 106 are physically and/or structurally configured in accordance with computer program instructions.

The computer program portions may be written in any high-level language such as C, C++, C# or the like or any low-level, assembly or machine language. The computer program portions may be written in a browser-based language such as Java, ActiveX or the like. The computer program portions may also be written in a scripting language, like JavaScript, for example. In summary, all manner of languages may be used.

Figure 4:
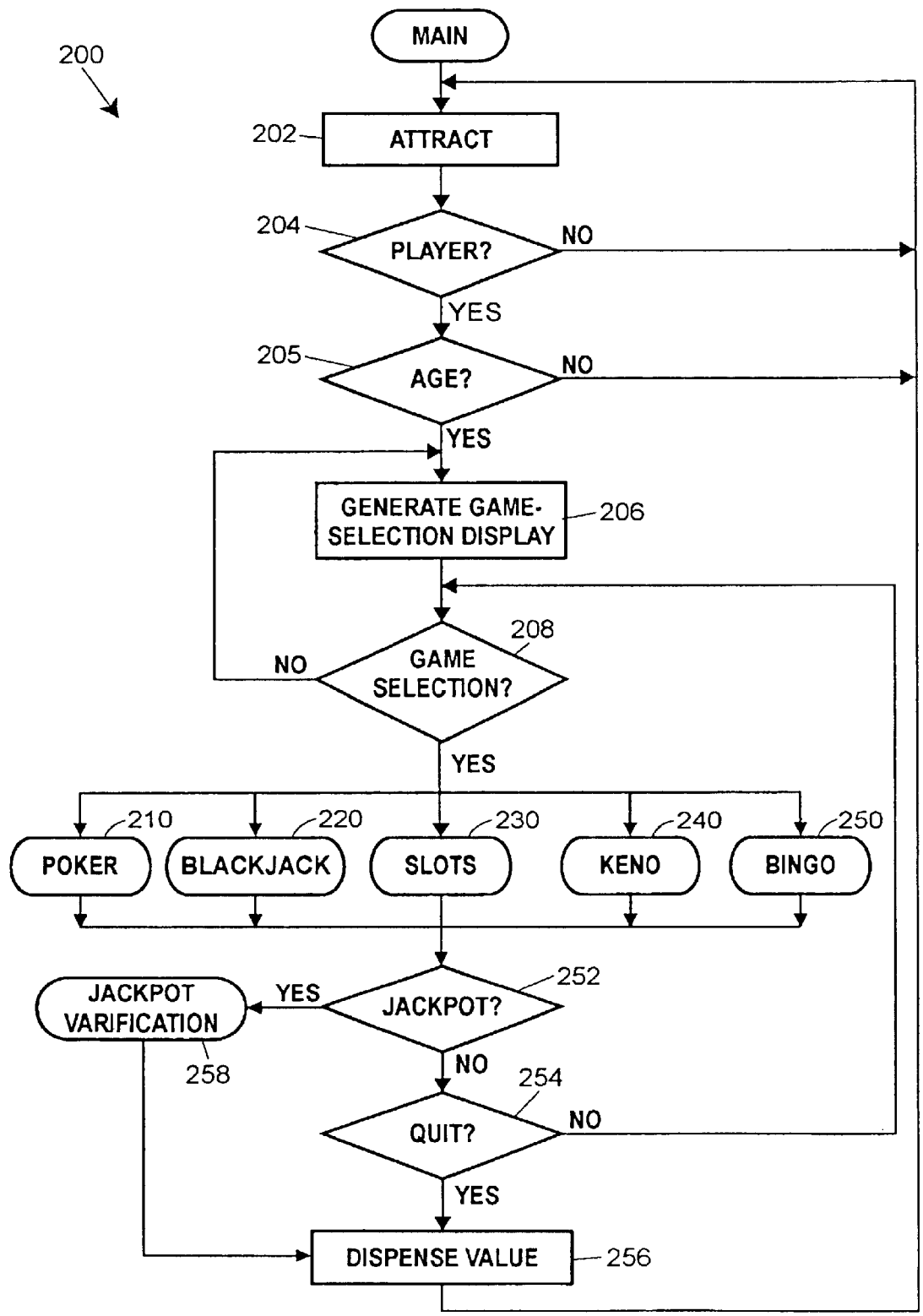
FIG. 4 is a flowchart of an embodiment of a main routine that may be performed during operation of one or more of the gaming units.

FIG. 4 is a flowchart of a main operating routine 200 that may be stored in the memory of the controller 100. The main routine 200 may begin operation at block 202 during which an attraction sequence may be performed in an attempt to induce a potential player to play the gaming unit 20. The attraction sequence may be performed by displaying one or more video images on the display unit 70 and/or causing one or more sound segments, such as voice or music, to be generated via the speakers 62. The attraction sequence may include a scrolling list of games that may be played on the gaming unit 20 and/or video images of various games being played, such as video poker, video blackjack, video slots, video keno, video bingo, etc.

During performance of the attraction sequence, if a potential player makes any input to the gaming unit 20 as determined at block 204, the attraction sequence may be terminated and the routine may proceed to block 205. The gaming unit 20 may detect an input at block 204 in various ways. For example, the gaming unit 20 could detect if the player presses any button on the gaming unit 20; the gaming unit 20 could determine if the player deposited one or more coins into the gaming unit 20; the gaming unit 20 could determine if the player deposited paper currency into the gaming unit; the gaming unit 20 could determine if the player deposited a voucher or coupon into the gaming unit; etc.

At block 205, a determination may be made as to whether the player meets minimum age requirements (set by state gaming agencies, for example) necessary to operate the gaming unit 20. For example, in a registration event at the gaming system operator's place of business, the player may provide proof of age and identity. The data may then be stored in a memory, such as a server operating as a database at the gaming system operator's place of business or a more portable memory device, such as a memory card or a PDA. The age data may be accessed later to prove age qualification by matching (within established standards) the identity data stored with the age data. Alternatively, the player may provide a form of identification (such as a fingerprint or other form of biometric data, driver's license, or national identity card) that the gaming system operator may use to access age data established by a third party (for example, the state department of motor vehicles). As a further alternative, the camera 92 associated with the gaming unit may be used to monitor the player using the gaming unit 20. The determination of block 205 may be omitted where the gaming system operator can limit access by underage players to the gaming units 20 (for example, in a casino-type gaming environment as opposed to an Internet-type gaming environment). If the determination is made and the player fails to age qualify, then the routine may branch back to block 202; if the player age qualifies or the determination is omitted, then the routine proceeds to block 206.

At block 206, a game-selection display may be generated on the display unit 70 to allow the player to select a game available on the gaming unit 20. The game-selection display generated at block 206 may include, for example, a list of video games that may be played on the gaming unit 20 and/or a visual message to prompt the player to deposit value into the gaming unit 20. While the game-selection display is generated, the gaming unit 20 may wait for the player to make a game selection. Upon selection of one of the games by the player as determined at block 208, the controller 100 may cause one of a number of game routines to be performed to allow the selected game to be played. For example, the game routines could include a video poker routine 210, a video blackjack routine 220, a slots routine 230, a video keno routine 240, and a video bingo routine 250. At block 208, if no game selection is made within a given period of time, the operation may branch back to block 202.

After one of the routines 210, 220, 230, 240, 250 has been performed to allow the player to play one of the games, the routine 200 may determine at block 252 if a jackpot was awarded. If no jackpot has been awarded, the routine 200 branches to block 254 to determine whether the player wishes to terminate play on the gaming unit 20 or to select another game. If the player wishes to stop playing the gaming unit 20, which wish may be expressed, for example, by selecting a "Cash Out" button 74, the controller 100 may dispense value to the player at block 256 based on the outcome of the game(s) played by the player. The operation may then return to block 202. If the player did not wish to quit as determined at block 254, the routine 200 may return to block 208 where the game-selection display may again be generated to allow the player to select another game.

If, on the other hand, it is determined that at block 252 that a jackpot has been awarded, the routine 200 branches to a payout administration routine 258. After the payout administration routine 258 has been performed, the routine 200 proceeds to block 256, and the jackpot award, along with whatever other value that the player has accumulated while playing the gaming unit 20, is distributed.

It should be noted that although five gaming routines are shown in FIG. 4, a different number of routines could be included to allow play of a different number of games. The gaming unit 20 may also be programmed to allow play of different games.

Figure 5:
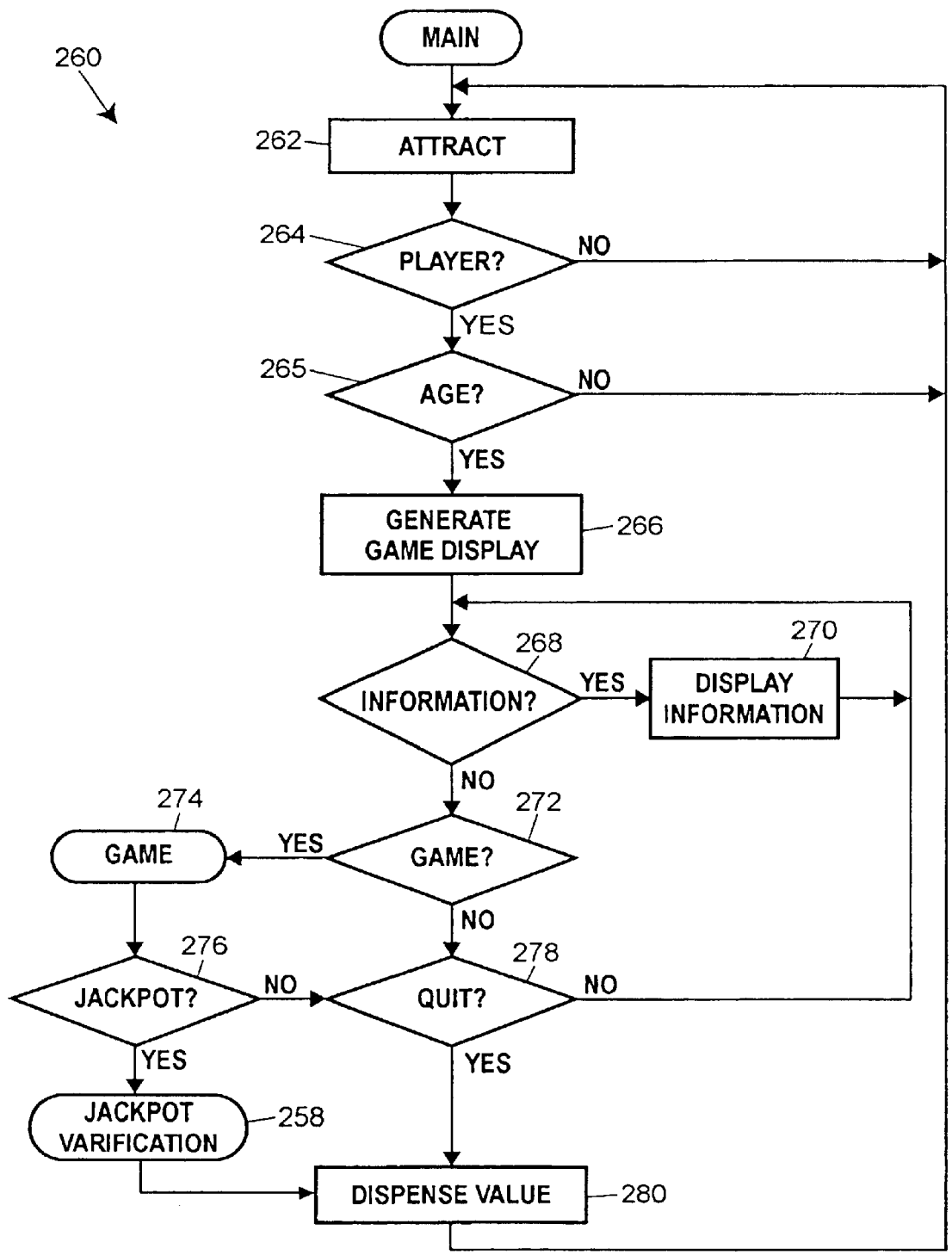
FIG. 5 is a flowchart of an alternative embodiment of a main routine that may be performed during operation of one or more of the gaming units.

FIG. 5 is a flowchart of an alternative main operating routine 260 that may be stored in the memory of the controller 100. The main routine 260 may be utilized for gaming units 20 that are designed to allow play of only a single game or single type of game. Referring to FIG. 5, the main routine 260 may begin operation at block 262 during which an attraction sequence may be performed in an attempt to induce a potential player in a casino to play the gaming unit 20. The attraction sequence may be performed by displaying one or more video images on the display unit 70 and/or causing one or more sound segments, such as voice or music, to be generated via the speakers 62.

During performance of the attraction sequence, if a potential player makes any input to the gaming unit 20 as determined at block 264, the attraction sequence may be terminated and an age determination may be made at block 265. Assuming that the player is age-qualified or the age determination is omitted, then a game display may be generated on the display unit 70 at block 266. The game display generated at block 266 may include, for example, an image of the game that may be played on the gaming unit 20 and/or a visual message to prompt the player to deposit value into the gaming unit 20. At block 268, the gaming unit 20 may determine if the player requested information concerning the game, in which case the requested information may be displayed at block 270. Block 272 may be used to determine if the player requested initiation of a game, in which case a game routine 274 may be performed. The game routine 274 could be any one of the game routines disclosed herein, such as one of the five game routines 210, 220, 230, 240, 250, or another game routine.

After the routine 274 has been performed to allow the player to play the game, block 276 may be utilized to determine if a jackpot has been awarded. If a jackpot has been awarded, the routine 274 proceeds to block 258 wherein the payout administration routine is performed. If a jackpot has not be awarded, then the routine 274 proceeds to block 278 to determine whether the player wishes to terminate play on the gaming unit 20. If the player wishes to stop playing the gaming unit 20, which wish may be expressed, for example, by selecting the "Cash Out" button 74, the controller 100 may dispense value to the player at block 280 based on the outcome of the game(s) played by the player. The operation may then return to block 262. If the player did not wish to quit as determined at block 278, the operation may return to block 268.

Payout Administration Routine

Figure 6A:
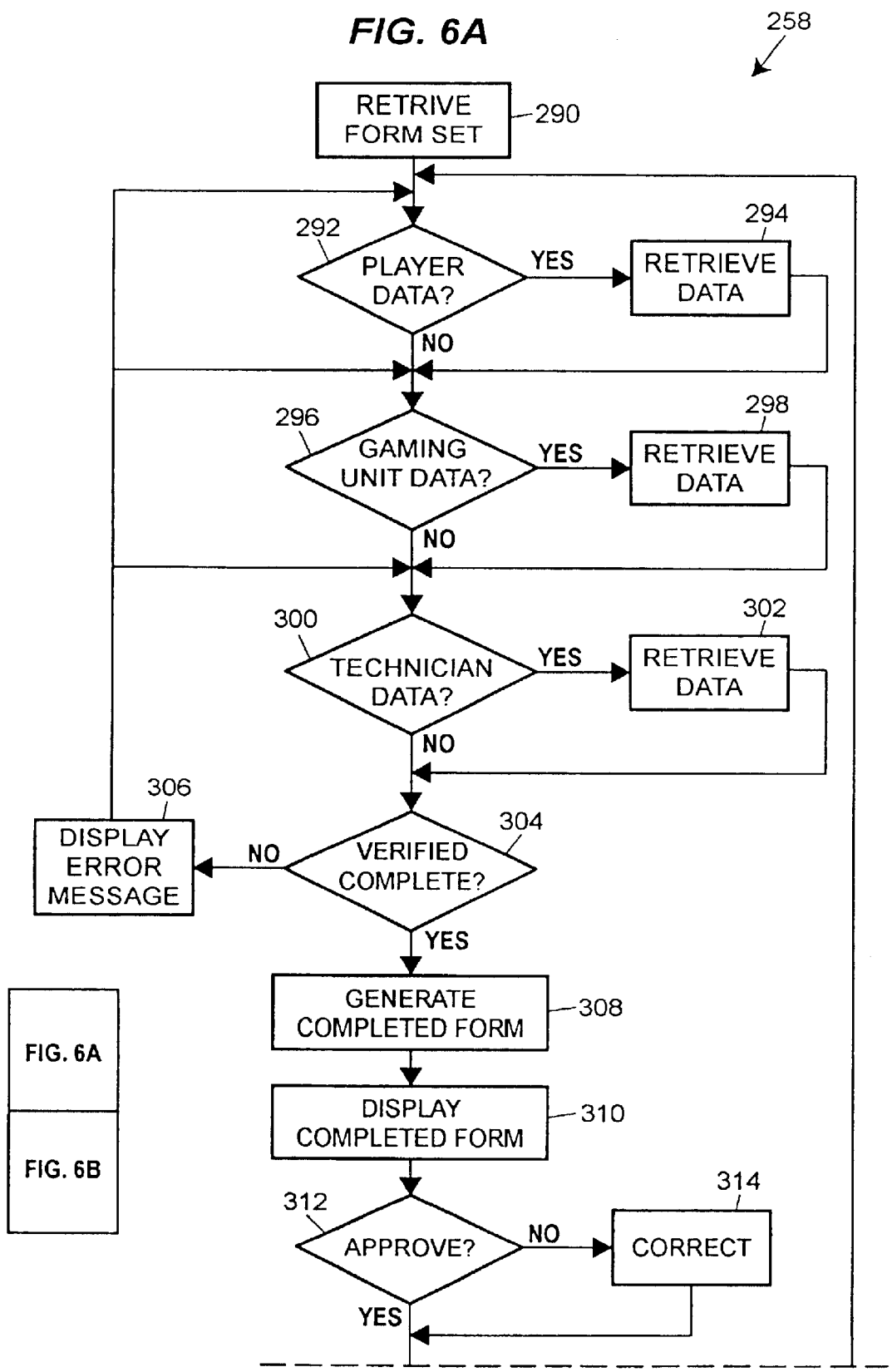
FIGS. 6A–B are a flowchart of a electronic payout administration routine in accordance with the invention that may be performed during operation of the gaming system of FIG. 1.
Figure 6B:
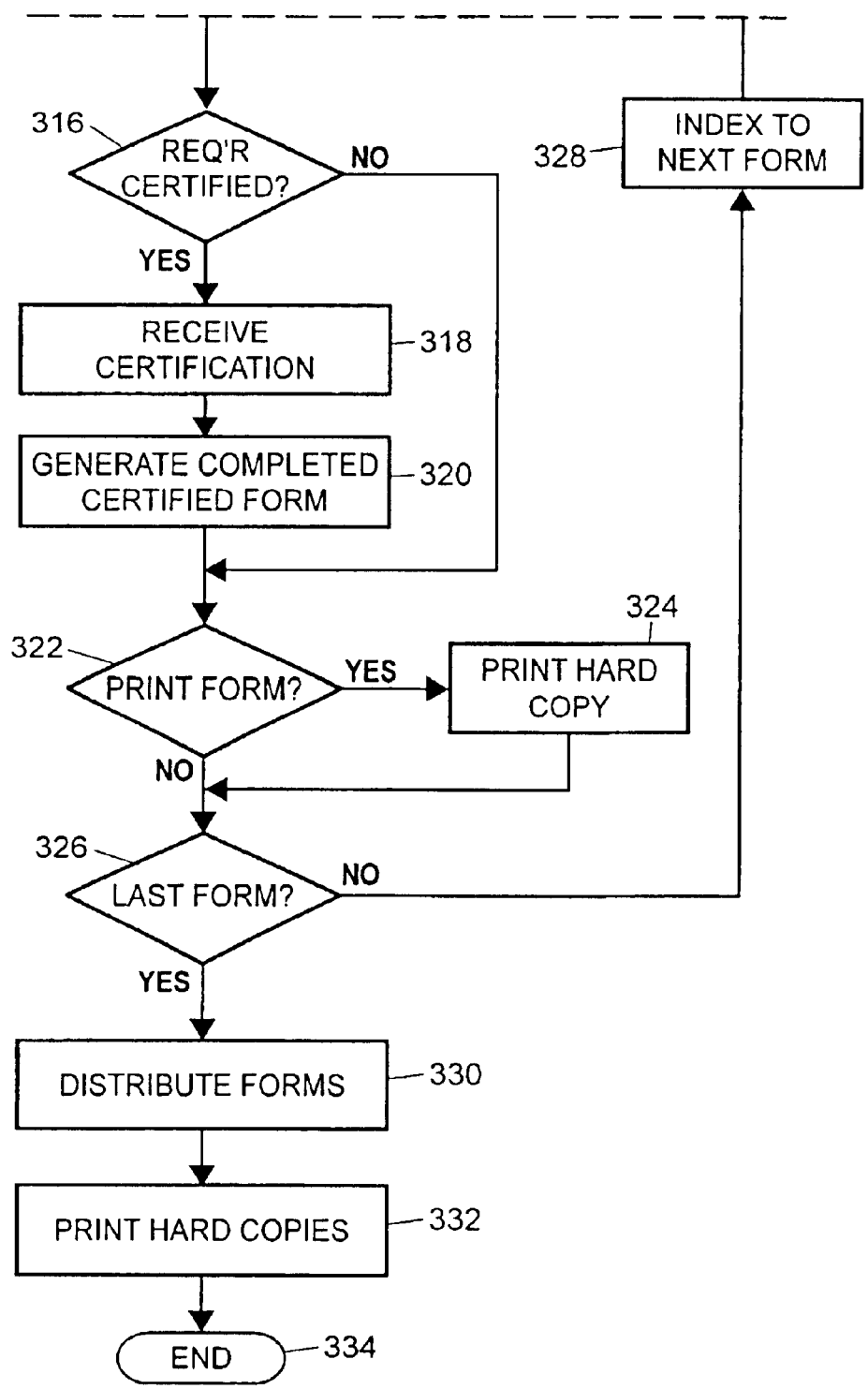

FIGS. 6A–B are a flowchart of one possible embodiment of the payout administration routine 258 shown schematically in FIGS. 4 and 5. The routine 258 may begin at block 290 with certain player and/or gaming unit verifications and the retrieval of a set of electronic forms necessary to meet the federal, state, and local regulatory agency requirements applicable to the payout awarded. Typically, a representative of the gaming system operator responsible for the system 10 will perform the retrieval of the forms, although the retrieval (and the entire routine for that matter) may be fully automated and displayed using the display unit 70, for example.

In regard to player verifications that may be performed at block 290, the age of the player may be initially checked. The comments made above regarding blocks 205, 265 may be equally applicable herein concerning the age qualification determination made at block 290. Moreover, the age of the player may be checked at block 290 even if the age was checked at block 205, 265 to provide additional confidence as to the player's age qualification.

Also, in regard to an implementation where gaming units 20, 30 may be operated at locations outside the gaming system operator's property (e.g., over the Internet), the gaming system operator may have to verify the location of the player and/or gaming unit 20, 30 before awarding the payout and performing the payout administration routine. This verification may ensure that the jackpot is legally awarded (as gaming is not legal in all jurisdictions), as well as ensuring that the correct forms are retrieved.

To verify the location of a gaming unit 20, 30 located outside the gaming system operator's property, the gaming unit 20, 30 may be associated with a device that provides location data for the gaming unit 20, 30 that may be transmitted to the gaming system operator. For example, the Global Positioning Satellite (GPS) system may be utilized by associating a special transceiver with the gaming unit. As a further example, the gaming system operator may require the player to connect to the system 10 using a cellular mobile station (or at a minimum to make a call using the mobile station or to turn the cellular mobile station on during play). The gaming system operator may then access the location information available to the cellular system operator after the cellular system operator has processed the cellular transmission data from the mobile station (such as may be done in providing enhanced 911 (or E-911) service, for example). Alternatively, the player may be required to connect to the system 10 from a land line (or to call the gaming system operator using a land line telephone during the verification process), whereupon the gaming system operator may check the telephone company's records to verify the number and pull the street address associated with the number. As a further alternative, where the player has connected to the system 10 over the Internet, the gaming system operator may check the IP address of the gaming unit 20, 30 and of the Internet service provider, and obtain a street address from the Internet service provider.

The forms may be retrieved from a database maintained at the gaming unit 20, the network computers 22, 32, or one of the remote computers 46, and the forms may be processed at the gaming unit 20, the network computer 22, 32 or the PDA 90 (in which case data may be transferred using the port/antenna 88), for example. The forms may include only those forms necessary to satisfy the requirements of the agencies of a particular jurisdiction (e.g., Nevada, New Jersey, California, etc.), or all of the forms necessary to satisfy the requirements of all jurisdictions may be stored. In the later case, as part of the retrieval of the forms, a determination may be made as to which agencies have jurisdiction of the system 10, network 26, 40, or the individual gaming unit 20. This determination may be made based on data programmed into the system 10, data entered each the time the retrieval of the forms is performed, or data obtained using the methods described above.

Once the forms have been retrieved, the first form may be processed by proceeding to block 292, where a determination may be made as to whether the form being processed requires data about the player (e.g., name, age, Social Security Number, address, phone number, shirt size, etc.). If it is determined that the form requires data about the player, data may be retrieved at block 294 from a source of stored personal data about the player.

The source of stored personal data may be a server that is part of the computer 22, 32 and that functions as a player personal data database and in which player personal data may be stored. Data may be entered into the database manually by the player and/or by an employee of the gaming system operator, or may be generated automatically, for example, by the servers that make up the computers 22, 32. The database may be periodically updated manually by the player and/or gaming system employees and/or automatically by the servers which make up the computer 22, 32 or which are associated with the computer 22, 32 and which monitor the player's usage of the gaming units 20 according to a voluntary player tracking system, for example.

If the data is to be entered manually, a device such as a keyboard or an input pad/stylus may be used. Alternatively, data may be entered by hand onto a sheet of paper that is scanned and converted into electronic data. For example, software such as OmniPage and TextBridge provided by ScanSoft Inc. (Peabody, Mass.), or similar programs from Expervision (Fremont, Calif.), ScanSoft Hungary Corp. (formerly Recognita, Budapest, Hungary), and Scantron (Tustin, Calif.), can convert handwriting to a computer text file.

The stored player data may be initially entered and uploaded to a database, such as a server that is part of the computer 22, 32, and then downloaded to a more portable memory device, such as a memory card or a PDA. The stored data may also be entered at the time the payout administration routine is performed and stored in temporary memory of the gaming unit 20, the computers 22, 32, 46 or the PDA 90, for example.

A determination may also be made at block 296 as to whether it is necessary to retrieve data about the gaming unit 100 to complete the form. If so, the routine may proceed to block 298; if not, the routine may proceed to block 300. At block 300, a determination may be made if it is necessary to retrieve data about the jackpot representative or technician gathering the data for the gaming system operator. If technician data is required, the routine may proceed to block 302; otherwise, the routine may proceed to block 304.

At block 304, the requirements of the form being processed and the data retrieved (at blocks 294, 298, 302) may be compared to determine if it is necessary to retrieve additional data. For example, if the data is initially retrieved from a database, there may be elements of data necessary to complete the form which are not typically stored in the database (e.g., shirt size or signature). In such a case, it may be necessary to enter additional data at the time the payout administration routine is performed (and store it in temporary memory) so that the forms may be completed. An error message may be displayed at block 306 to provide a indication as to why the routine cannot proceed, and the routine may return to block 292.

If all of the data necessary to complete the form has been retrieved, as determined at block 304, the routine may proceed to block 308 and the retrieved data may be combined with the form to generate a completed form. The completed form may be displayed, for example on the display unit 70 of the gaming unit 20 or the PDA 90, at block 310 for the player and/or jackpot representative/technician to review. As a result of the visual inspection of the completed form, a determination may be made if all of the retrieved data has been correctly combined with the form at block 312. If any of the entered data is incorrect, then at block 314 the incorrect data may be replaced with correct data. If no correction is required, or after any required correction is made, the routine may proceed to block 316.

At block 316, a determination may be made as to whether the complete form requires certification. Not all forms will require certification, but many may. If certification is required, the routine may proceed to block 318, and the completed form may be certified by the appropriate party, e.g. the player and/or the jackpot representative/technician.

The certification may be made by using any of a variety of mechanisms, including one or more of the following: the card reader 58, the keypad 84, the input pad 86 (and the stylus 87), the input port 88 (and the PDA 90), the digital camera 92, the scanner 94, the retinal (or iris) scanner 96, fingerprint scanner 97 and the microphone 100. As stated above, any of these devices may be used to sample and generate a representation, in the form of electronic data, of a unique characteristic of the party (Personal Identification Number (PIN), signature, fingerprint, voice print, appearance, etc.) wishing to certify the completed form. The electronic data representation of the unique characteristic may then be compared with stored data to determine if the electronic data representation accurately represents the party wishing to certify the complete form.

For example, using the stylus 87, a signature may be entered on the input pad 86. The signature may be captured using electronic signature capture software, and converted into electronic data (e.g., a bitmap image). The electronic data may then optionally be routed to electronic signature authentication software.

The signature capture software and the signature authentication software may be co-located at the gaming unit 100. Alternatively, the signature authentication software may be located remotely from the signature capture software. If the signature capture software and the signature authentication software are located remotely, then the electronic data may be encrypted before transmission and decrypted afterward.

The signature authentication software may determine if the electronic data falls within the authentication parameters of electronic data representing a signature in an electronic signature database. The comparison may be made using matching or pattern recognition techniques. The authentication parameters may be varied according to legal standards for authenticating "electronic signatures," according to industry custom and practice and/or according to gaming system operator preferences.

Once the certification is received, the certification may be combined with the completed form at block 320 to generate a certified completed form. Block 322 may be utilized to determine if a print out of the certified completed form is desired, and if it is, the form may be printed out using the printer 56 or a separate hand-held printer (not shown) coupled to the PDA 90 at block 324.

At block 326, a determination may be made as to whether the form just processed is the last form in the set that was selected. If the form is not the last form in the set, then the routine may index to the next form at block 328 and return to block 292. If the form is the last form in the set, the set of certified completed forms may be uploaded, encrypted and distributed to the one or more remote computers 46 at block 330. As a backup, one or more copies of the certified completed forms may be printed out either using the printer 56 or a remote printer (not shown) at block 332. The routine ends at block 334.

The following is provided as just one possible example of the operation of the payout administration routine 258.

Assuming that the determination is made at block 252, for example, that a jackpot (e.g., payout of greater than $1,200) has been awarded, then at block 290, a set of forms is retrieved. In this case, the set includes federal tax forms, as well as state and local gaming regulatory agency forms. The set also includes forms which the gaming system operator will use to process the jackpot award, and may include the jackpot check itself. This set is merely exemplary, and is not intended to be limiting.

The first form is the W-2G "Certain Gambling Winnings" form used to report the winnings to the U.S. Internal Revenue Service (I.R.S.). The W-2G requires personal data (including name and Social Security number) and a player certification, for example in the form of a signature. Consequently, at block 292, an affirmative answer leads to block 294 wherein the personal player data is retrieved, either from a database or from temporary storage after the jackpot representative enters the data based on the player's answers to questions displayed, for example, on the display unit 70.

Assuming that the necessary data is retrieved at block 294, a further affirmative answer to the determination that the form is complete results in the routine proceeding to blocks 308, 310 to combine the player personal data with the electronic W-2G form and display the completed form via the display unit 70. Assuming that the data has been correctly entered, such that there is no need to correct the form, the routine proceeds to blocks 316, 318 and the player provides his or her certification. For purposes of illustration, the player may enter his or her certification by using the stylus 87 to enter a signature on the input pad 86, although, as pointed out above, there are many different methods to enter the certification. The certified completed form is then generated at block 320.

Considering the nature of the W-2G form, the player may wish to have a copy of the certified completed form. Consequently, at blocks 322, 324, the printer 56 prints a copy of the certified completed W2G form, which is presented to the player. As this is not the last form in the set, at block 326 the routine returns to block 292 after indexing to the next form at block 328.

The next form to be completed is the U.S. I.R.S. W-9 "Request for Taxpayer Identification Number and Certification." The routine proceeds from blocks 292, 294 (where player personal data is retrieved, namely the player's name and Social Security number) to block 316 via blocks 308, 310, 312. At block 318, the player would certify by signing the input pad 86 using the stylus 87. Again, because of the nature of the form, a copy would be printed out for the player at blocks 322, 324 before returning to block 292 via blocks 326, 328.

The next form is the media release form. This form may requires data about the player (name, address) as well as the gaming unit 20 (casino, location in casino). The data is retrieved at blocks 292, 294, 296, 298 and used to generate the completed form at block 308. The player's signature (or "anonymous" mark) is received at block 318, before returning to block 292 via blocks 326, 328.

The routine the proceeds to the primary jackpot report and the primary jackpot hit report. These forms require data about the gaming unit 100 involved, so blocks 296, 298 are used to retrieve data about the gaming unit 100, for example, from the network computers 22, 32. At block 318, the forms are certified by the jackpot representative by entering his or her signature on the PDA 90 and transmitting the electronic data representation of the signature via the input port 88, for example.

The next form is the wide area program system questionnaire. This form requires data about the player, retrieved at blocks 292, 294, but does not require certification. Instead, the completed form will be displayed at block 310 for approval at block 312, and then the routine will return to block 292 via blocks 326, 328.

At this point, the initial payment jackpot check is prepared using player personal data (blocks 292, 294) and is printed out using the printer 56 (block 322, 324). The check may be scanned using scanner 94 for record keeping purposes. Additionally, a confirmation letter form is prepared from player personal data retrieved at blocks 292, 294, combined at block at block 308, and displayed at block 310. This letter is approved at block 312, and both the player and the jackpot representative certify at block 318. A copy of the letter is printed out at blocks 320, 322 for the player.

The next form relates to the selection of a lump-sum or annuity payment. The player has the option of receiving the jackpot as a single, or lump-sum, payment, or a series of payments as an annuity. If the player selects to received the jackpot in the form of the annuity payments, then an annuity notification letter form is prepared using player data at blocks 292, 294, and printed out at blocks 320, 322.

The gaming system operator may offer additional premiums to the winner of a jackpot, such as clothing or other merchandise. For example, the gaming system operator may provide a commemorative shirt to jackpot winners. In such a case, a shirt order form is prepared using player personal data at blocks 292, 294, and a copy is printed out and presented to the player at blocks 320, 322.

The last series of forms are prepared to satisfy state and local regulatory requirements regarding the operation of the gaming unit 100 that determined that a jackpot should be awarded. The series of forms include the primary jackpot administration form, the megajackpot seal recordation form, the gaming system operator communicator log sheet and the machine meter reading form. Each of these forms require the retrieval of data concerning the gaming unit (blocks 296, 298) and about the technician preparing the forms (blocks 300, 302). All of the forms are generated (block 308) and displayed (block 310) for approval (block 312) of the jackpot representative. When they are correct, the jackpot representative certifies each form at block 318.

With all of the forms prepared, the routine 258 passes to block 328, and the forms are distributed to the various agencies involved. The distribution may include having the appropriate forms uploaded, encrypted and transferred to a remote agency computer, or the forms may be routed to communications software that formats and transmits the forms to a remote agency facsimile machine (not shown). The distribution may also include uploading the forms to a dedicated jackpot database that the system operator maintains for purposes of verifying compliance with regulatory requirements. Additional hard copies of the forms may be printed out at block 330 for archival purposes, or for manual mailing instead of electronic distribution.

Having discussed the operation of the main routine 200 and the payout administration routine 258, the gaming routines 210, 220, 230, 240, 250 are now discussed in greater detail.

Video Poker

Figure 7:
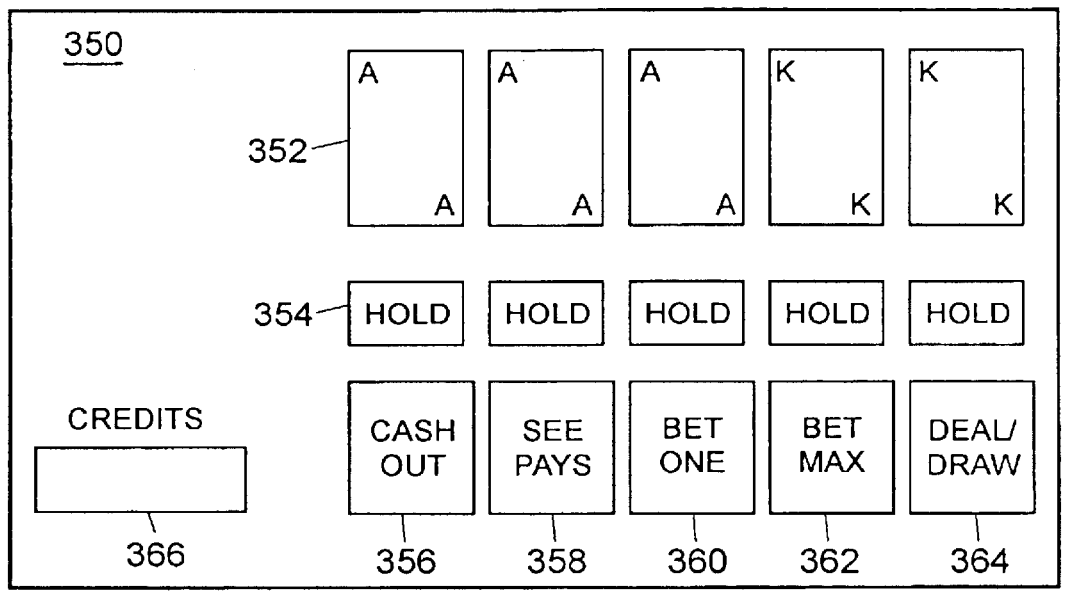
FIG. 7 is an illustration of an embodiment of a visual display that may be displayed during performance of the video poker routine of FIG. 9.

FIG. 7 is an exemplary display 350 that may be shown on the display unit 70 during performance of the video poker routine 210 shown schematically in FIG. 4. Referring to FIG. 7, the display 350 may include video images 352 of a plurality of playing cards representing the player's hand, such as five cards. To allow the player to control the play of the video poker game, a plurality of player-selectable buttons may be displayed. The buttons may include a "Hold" button 354 disposed directly below each of the playing card images 352, a "Cash Out" button 356, a "See Pays" button 358, a "Bet One Credit" button 360, a "Bet Max Credits" button 362, and a "Deal/Draw" button 364. The display 350 may also include an area 366 in which the number of remaining credits or value is displayed. If the display unit 70 is provided with a touch-sensitive screen, the buttons 354, 356, 358, 360, 362, 364 may form part of the video display 350. Alternatively, one or more of those buttons may be provided as part of a control panel that is provided separately from the display unit 70.

Figure 9:
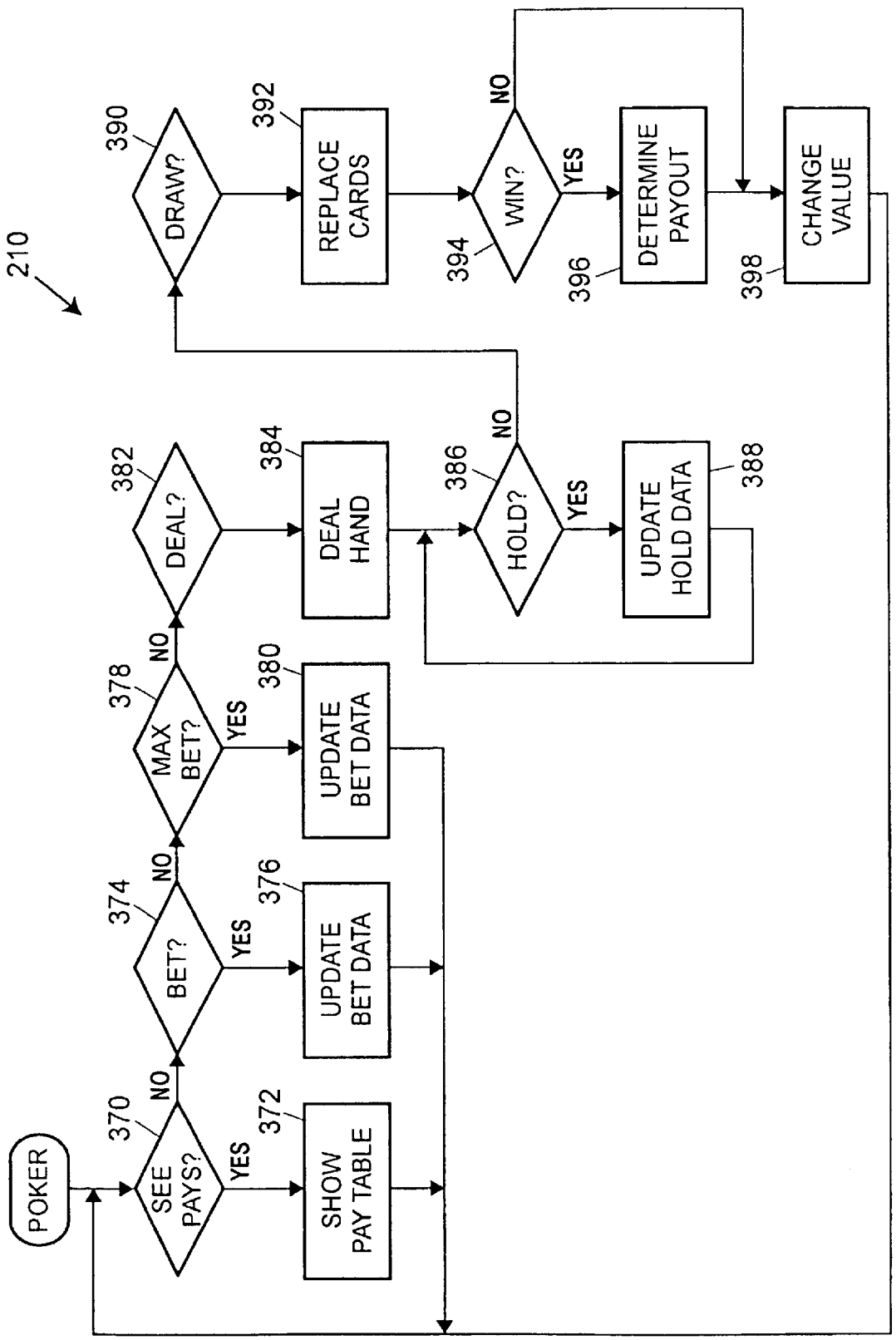
FIG. 9 is a flowchart of an embodiment of a video poker routine that may be performed by one or more of the gaming units.

FIG. 9 is a flowchart of the video poker routine 210 shown schematically in FIG. 4. Referring to FIG. 9, at block 370, the routine may determine whether the player has requested payout information, such as by activating the "See Pays" button 358, in which case at block 372 the routine may cause one or more pay tables to be displayed on the display unit 70. At block 374, the routine may determine whether the player has made a bet, such as by pressing the "Bet One Credit" button 360, in which case at block 376 bet data corresponding to the bet made by the player may be stored in the memory of the controller 100. At block 378, the routine may determine whether the player has pressed the "Bet Max Credits" button 362, in which case at block 380 bet data corresponding to the maximum allowable bet may be stored in the memory of the controller 100.

At block 382, the routine may determine if the player desires a new hand to be dealt, which may be determined by detecting if the "Deal/Draw" button 364 was activated after a wager was made. In that case, at block 384 a video poker hand may be "dealt" by causing the display unit 70 to generate the playing card images 352. After the hand is dealt, at block 386 the routine may determine if any of the "Hold" buttons 354 have been activated by the player, in which case data regarding which of the playing card images 352 are to be "held" may be stored in the controller 100 at block 388. If the "Deal/Draw" button 364 is activated again as determined at block 390, each of the playing card images 352 that was not "held" may be caused to disappear from the video display 350 and to be replaced by a new, randomly selected, playing card image 352 at block 392.

At block 394, the routine may determine whether the poker hand represented by the playing card images 352 currently displayed is a winner. That determination may be made by comparing data representing the currently displayed poker hand with data representing all possible winning hands, which may be stored in the memory of the controller 100. If there is a winning hand, a payout value corresponding to the winning hand may be determined at block 396. At block 398, the player's cumulative value or number of credits may be updated by subtracting the bet made by the player and adding, if the hand was a winner, the payout value determined at block 396. The cumulative value or number of credits may also be displayed in the display area 366 (FIG. 7).

Although the video poker routine 210 is described above in connection with a single poker hand of five cards, the routine 210 may be modified to allow other versions of poker to be played. For example, seven card poker may be played, or stud poker may be played. Alternatively, multiple poker hands may be simultaneously played. In that case, the game may begin by dealing a single poker hand, and the player may be allowed to hold certain cards. After deciding which cards to hold, the held cards may be duplicated in a plurality of different poker hands, with the remaining cards for each of those poker hands being randomly determined.

Video Blackjack

Figure 8:
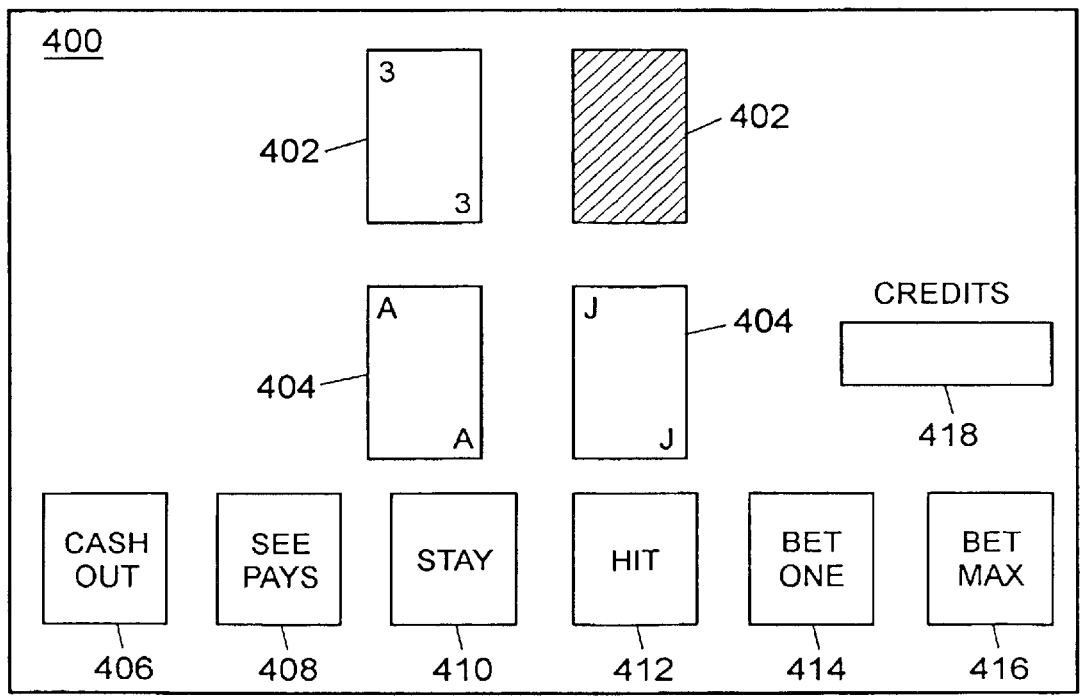
FIG. 8 is an illustration of an embodiment of a visual display that may be displayed during performance of the video blackjack routine of FIG. 10.

FIG. 8 is an exemplary display 400 that may be shown on the display unit 70 during performance of the video blackjack routine 220 shown schematically in FIG. 4. Referring to FIG. 8, the display 400 may include video images 402 of a pair of playing cards representing a dealer's hand, with one of the cards shown face up and the other card being shown face down, and video images 404 of a pair of playing cards representing a player's hand, with both the cards shown face up. The "dealer" may be the gaming unit 20.

To allow the player to control the play of the video blackjack game, a plurality of player-selectable buttons may be displayed. The buttons may include a "Cash Out" button 406, a "See Pays" button 408, a "Stay" button 410, a "Hit" button 412, a "Bet One Credit" button 414, and a "Bet Max Credits" button 416. The display 400 may also include an area 418 in which the number of remaining credits or value is displayed. If the display unit 70 is provided with a touch-sensitive screen, the buttons 406, 408, 410, 412, 414, 416 may form part of the video display 400. Alternatively, one or more of those buttons may be provided as part of a control panel that is provided separately from the display unit 70.

Figure 10:
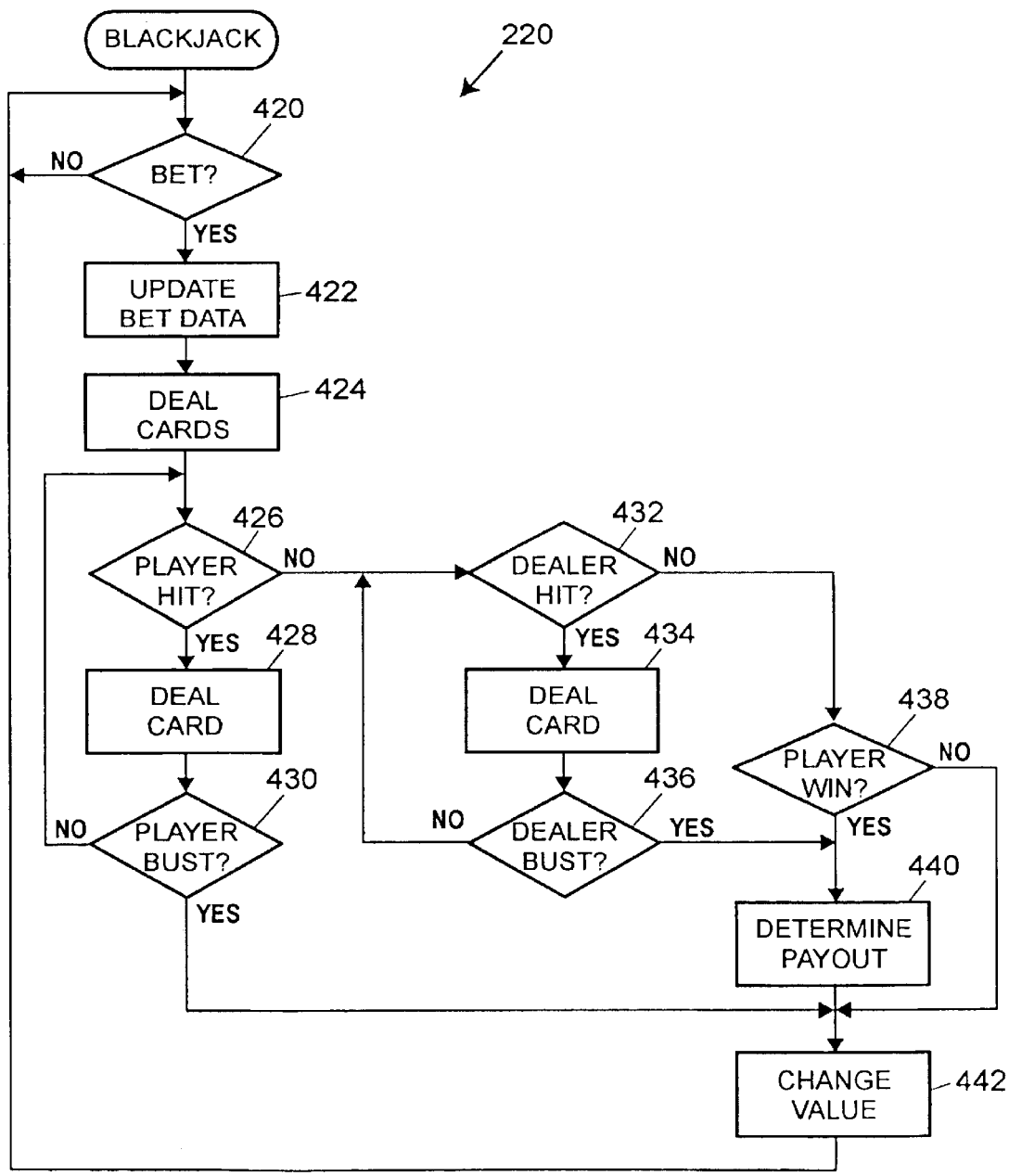
FIG. 10 is a flowchart of an embodiment of a video blackjack routine that may be performed by one or more of the gaming units.

FIG. 10 is a flowchart of the video blackjack routine 220 shown schematically in FIG. 4. Referring to FIG. 10, the video blackjack routine 220 may begin at block 420 where it may determine whether a bet has been made by the player. That may be determined, for example, by detecting the activation of either the "Bet One Credit" button 414 or the "Bet Max Credits" button 416. At block 422, bet data corresponding to the bet made at block 420 may be stored in the memory of the controller 100. At block 424, a dealer's hand and a player's hand may be "dealt" by making the playing card images 402, 404 appear on the display unit 70.

At block 426, the player may be allowed to be "hit," in which case at block 428 another card will be dealt to the player's hand by making another playing card image 404 appear in the display 400. If the player is hit, block 430 may determine if the player has "bust," or exceeded 21. If the player has not bust, blocks 426 and 428 may be performed again to allow the player to be hit again.

If the player decides not to hit, at block 432 the routine may determine whether the dealer should be hit. Whether the dealer hits may be determined in accordance with predetermined rules, such as the dealer always hit if the dealer's hand totals 15 or less. If the dealer hits, at block 434 the dealer's hand may be dealt another card by making another playing card image 402 appear in the display 400. At block 436 the routine may determine whether the dealer has bust. If the dealer has not bust, blocks 432, 434 may be performed again to allow the dealer to be hit again.

If the dealer does not hit, at block 436 the outcome of the blackjack game and a corresponding payout may be determined based on, for example, whether the player or the dealer has the higher hand that does not exceed 21. If the player has a winning hand, a payout value corresponding to the winning hand may be determined at block 440. At block 442, the player's cumulative value or number of credits may be updated by subtracting the bet made by the player and adding, if the player won, the payout value determined at block 440. The cumulative value or number of credits may also be displayed in the display area 418 (FIG. 8).

Slots

Figure 11:
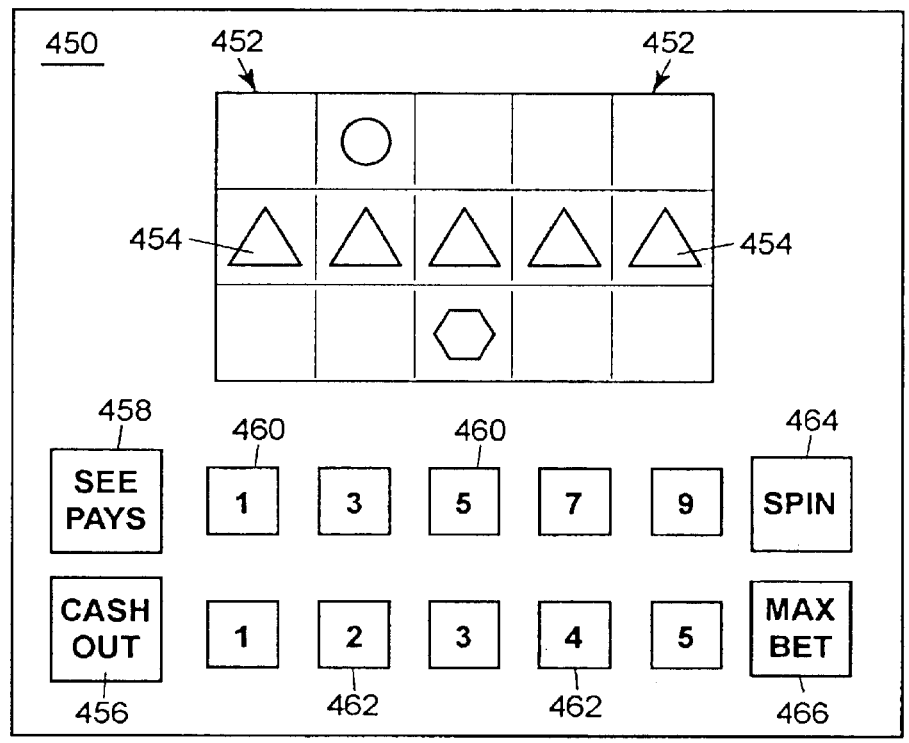
FIG. 11 is an illustration of an embodiment of a visual display that may be displayed during performance of the slots routine of FIG. 13.

FIG. 11 is an exemplary display 450 that may be shown on the display unit 70 during performance of the slots routine 230 shown schematically in FIG. 4. Referring to FIG. 11, the display 450 may include video images 452 of a plurality of slot machine reels, each of the reels having a plurality of reel symbols 454 associated therewith. Although the display 450 shows five reel images 452, each of which may have three reel symbols 454 that are visible at a time, other reel configurations could be utilized.

To allow the player to control the play of the slots game, a plurality of player-selectable buttons may be displayed. The buttons may include a "Cash Out" button 456, a "See Pays" button 458, a plurality of payline-selection buttons 460 each of which allows the player to select a different number of paylines prior to "spinning" the reels, a plurality of bet-selection buttons 462 each of which allows a player to specify a wager amount for each payline selected, a "Spin" button 464, and a "Max Bet" button 466 to allow a player to make the maximum wager allowable.

Figure 13:
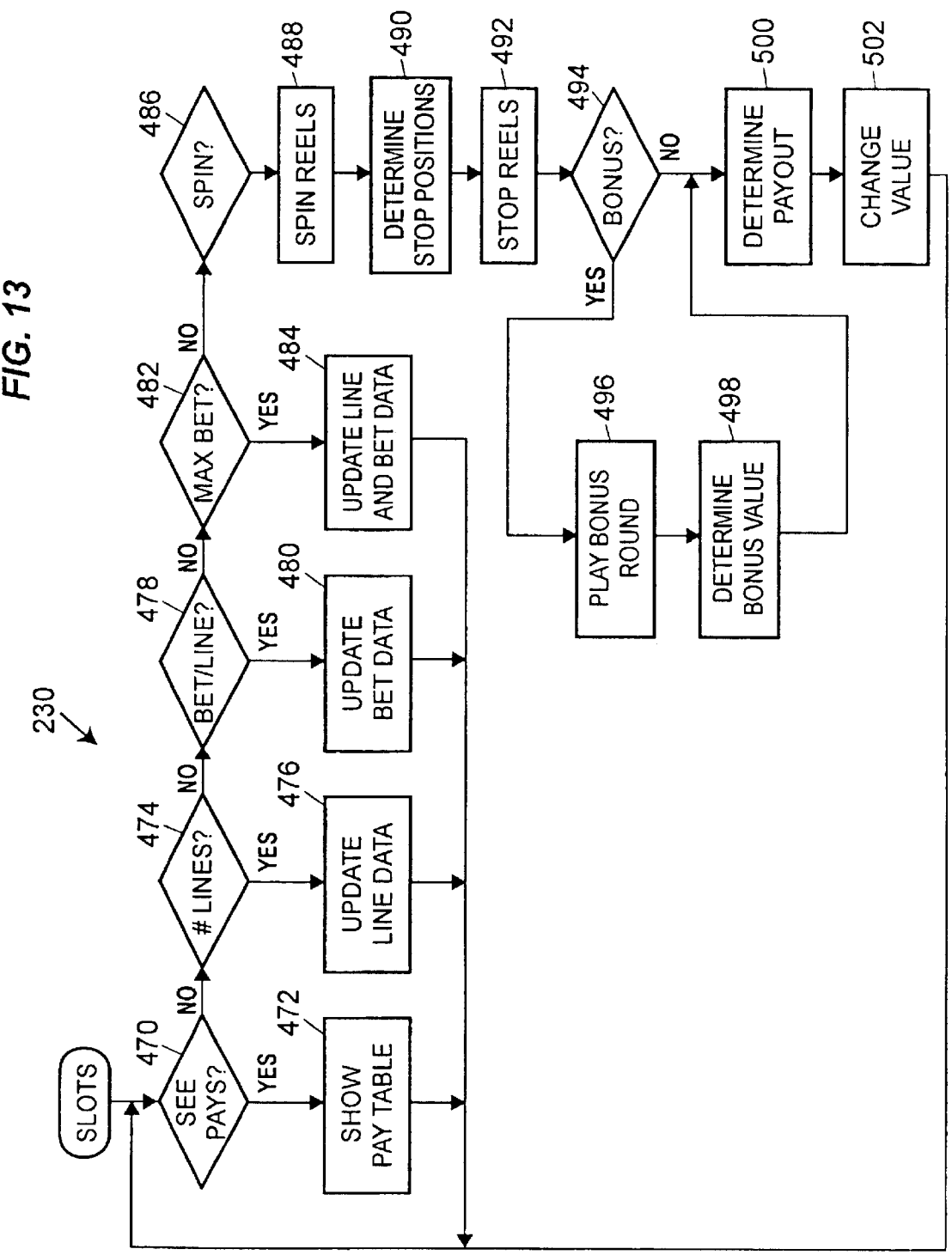
FIG. 13 is a flowchart of an embodiment of a slots routine that may be performed by one or more of the gaming units.

FIG. 13 is a flowchart of the slots routine 230 shown schematically in FIG. 11. Referring to FIG. 13, at block 470, the routine may determine whether the player has requested payout information, such as by activating the "See Pays" button 458, in which case at block 472 the routine may cause one or more pay tables to be displayed on the display unit 70. At block 474, the routine may determine whether the player has pressed one of the payline-selection buttons 460, in which case at block 476 data corresponding to the number of paylines selected by the player may be stored in the memory of the controller 100. At block 478, the routine may determine whether the player has pressed one of the bet-selection buttons 462, in which case at block 480 data corresponding to the amount bet per payline may be stored in the memory of the controller 100. At block 482, the routine may determine whether the player has pressed the "Max Bet" button 466, in which case at block 484 bet data (which may include both payline information and bet-per-payline information) corresponding to the maximum allowable bet may be stored in the memory of the controller 100.

If the "Spin" button 464 has been activated by the player as determined at block 486, at block 488 the routine may cause the slot machine reel images 452 to begin "spinning" so as to simulate the appearance of a plurality of spinning mechanical slot machine reels. At block 490, the routine may determine the positions at which the slot machine reel images will stop, or the particular symbol images 454 that will be displayed when the reel images 452 stop spinning. At block 492, the routine may stop the reel images 452 from spinning by displaying stationary reel images 452 and images of three symbols 454 for each stopped reel image 452. The virtual reels may be stopped from left to right, from the perspective of the player, or in any other manner or sequence.

The routine may provide for the possibility of a bonus game or round if certain conditions are met, such as the display in the stopped reel images 452 of a particular symbol 454. If there is such a bonus condition as determined at block 494, the routine may proceed to block 496 where a bonus round may be played. The bonus round may be a different game than slots, and many other types of bonus games could be provided. If the player wins the bonus round, or receives additional credits or points in the bonus round, a bonus value may be determined at block 498. A payout value corresponding to outcome of the slots game and/or the bonus round may be determined at block 500. At block 502, the player's cumulative value or number of credits may be updated by subtracting the bet made by the player and adding, if the slot game and/or bonus round was a winner, the payout value determined at block 500.

Although the above routine has been described as a virtual slot machine routine in which slot machine reels are represented as images on the display unit 70, actual slot machine reels that are capable of being spun may be utilized instead.

Video Keno

Figure 12:
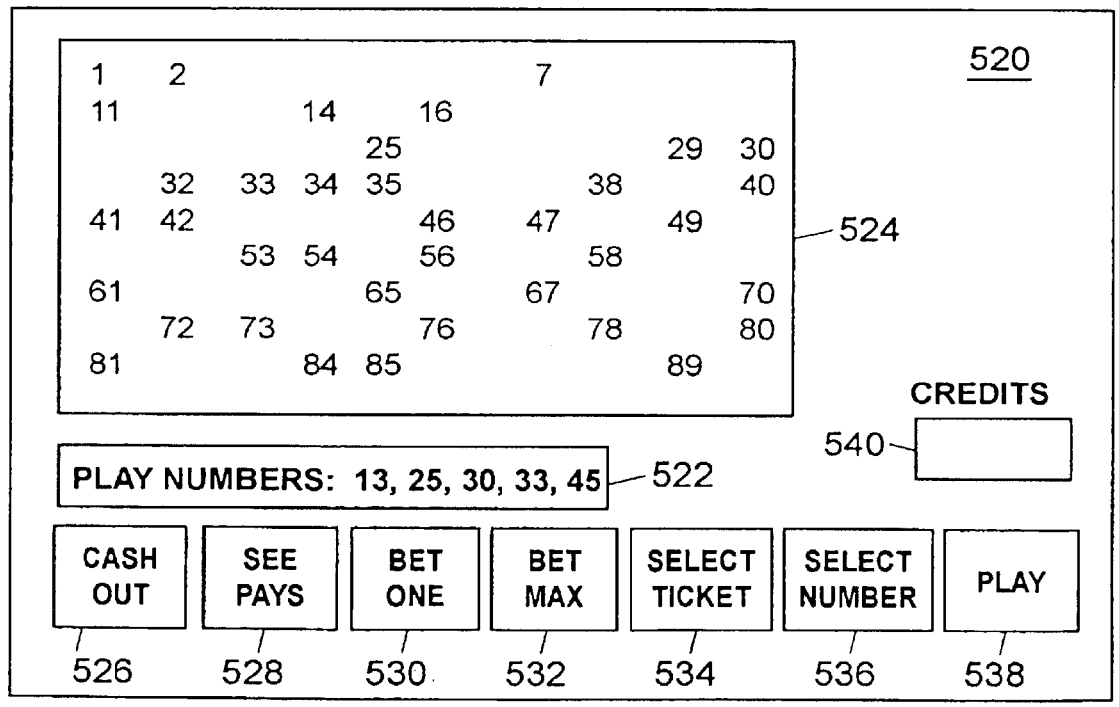
FIG. 12 is an illustration of an embodiment of a visual display that may be displayed during performance of the video keno routine of FIG. 14.

FIG. 12 is an exemplary display 520 that may be shown on the display unit 70 during performance of the video keno routine 240 shown schematically in FIG. 4. Referring to FIG. 12, the display 520 may include a video image 522 of a plurality of numbers that were selected by the player prior to the start of a keno game and a video image 524 of a plurality of numbers randomly selected during the keno game. The randomly selected numbers may be displayed in a grid pattern.

To allow the player to control the play of the keno game, a plurality of player-selectable buttons may be displayed. The buttons may include a "Cash Out" button 526, a "See Pays" button 528, a "Bet One Credit" button 530, a "Bet Max Credits" button 532, a "Select Ticket" button 534, a "Select Number" button 536, and a "Play" button 538. The display 520 may also include an area 540 in which the number of remaining credits or value is displayed. If the display unit 70 is provided with a touch-sensitive screen, the buttons may form part of the video display 520. Alternatively, one or more of those buttons may be provided as part of a control panel that is provided separately from the display unit 70.

Figure 14:
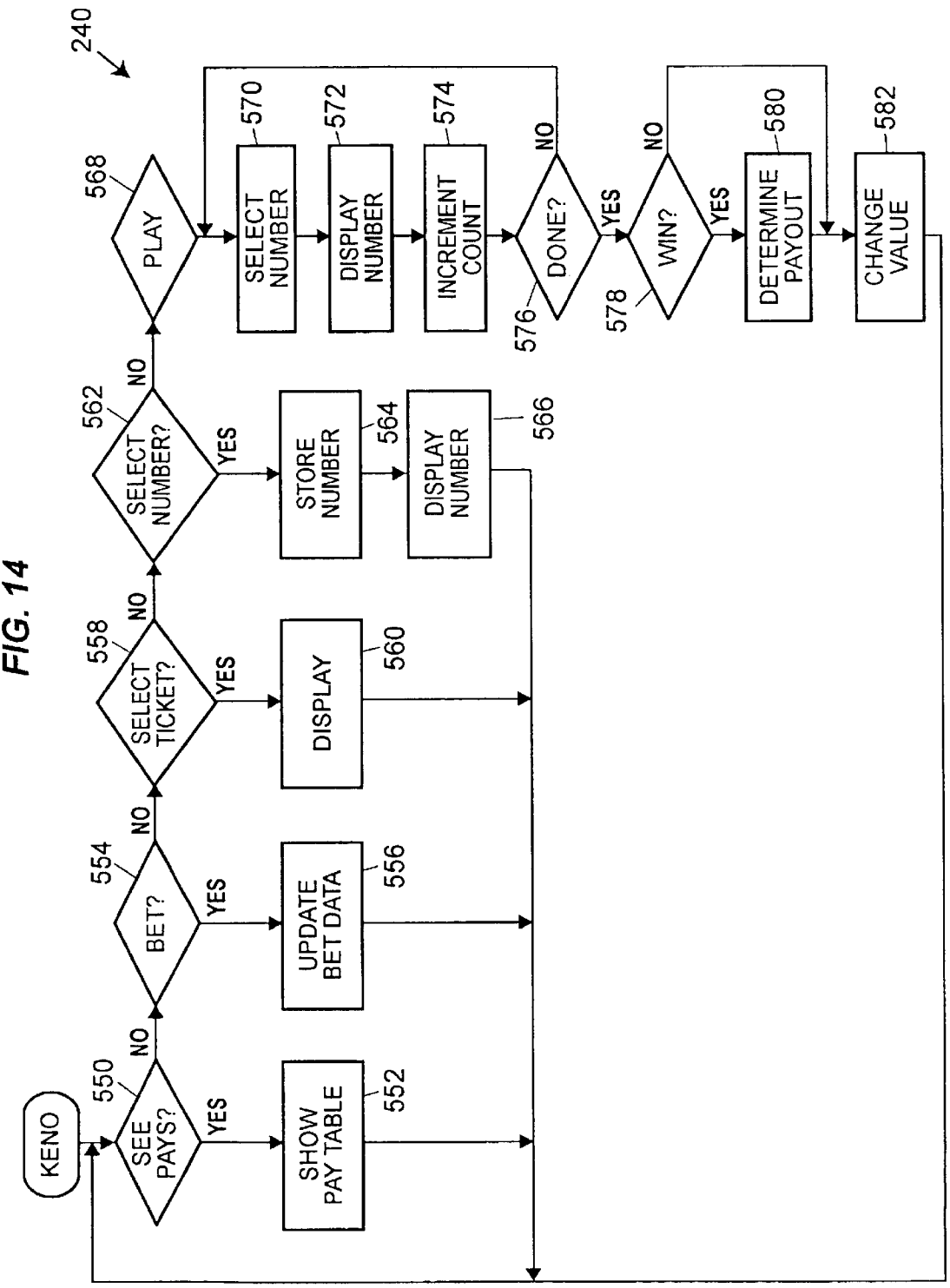
FIG. 14 is a flowchart of an embodiment of a video keno routine that may be performed by one or more of the gaming units.

FIG. 14 is a flowchart of the video keno routine 240 shown schematically in FIG. 4. The keno routine 240 may be utilized in connection with a single gaming unit 20 where a single player is playing a keno game, or the keno routine 240 may be utilized in connection with multiple gaming units 20 where multiple players are playing a single keno game. In the latter case, one or more of the acts described below may be performed either by the controller 100 in each gaming unit or by one of the network computer 22, 32 to which multiple gaming units 20 are operatively connected.

Referring to FIG. 14, at block 550, the routine may determine whether the player has requested payout information, such as by activating the "See Pays" button 528, in which case at block 552 the routine may cause one or more pay tables to be displayed on the display unit 70. At block 554, the routine may determine whether the player has made a bet, such as by having pressed the "Bet One Credit" button 530 or the "Bet Max Credits" button 532, in which case at block 556 bet data corresponding to the bet made by the player may be stored in the memory of the controller 100. After the player has made a wager, at block 558 the player may select a keno ticket, and at block 560 the ticket may be displayed on the display 520. At block 562, the player may select one or more game numbers, which may be within a range set by the gaming system operator. After being selected, the player's game numbers may be stored in the memory of the controller 100 at block 564 and may be included in the image 522 on the display 520 at block 566. After a certain amount of time, the keno game may be closed to additional players (where a number of players are playing a single keno game using multiple gambling units 20).

If play of the keno game is to begin as determined at block 568, at block 570 a game number within a range set by the gaming system operator may be randomly selected either by the controller 100 or a central computer operatively connected to the controller, such as one of the network computers 22, 32. At block 572, the randomly selected game number may be displayed on the display unit 70 and the display units 70 of other gaming units 20 (if any) which are involved in the same keno game. At block 574, the controller 100 (or the central computer noted above) may increment a count which keeps track of how many game numbers have been selected at block 570.

At block 576, the controller 100 (or one of the network computers 22, 32) may determine whether a maximum number of game numbers within the range have been randomly selected. If not, another game number may be randomly selected at block 570. If the maximum number of game numbers has been selected, at block 578 the controller 100 (or a central computer) may determine whether there are a sufficient number of matches between the game numbers selected by the player and the game numbers selected at block 570 to cause the player to win. The number of matches may depend on how many numbers the player selected and the particular keno rules being used.

If there are a sufficient number of matches, a payout may be determined at block 580 to compensate the player for winning the game. The payout may depend on the number of matches between the game numbers selected by the player and the game numbers randomly selected at block 570. At block 582, the player's cumulative value or number of credits may be updated by subtracting the bet made by the player and adding, if the keno game was won, the payout value determined at block 580. The cumulative value or number of credits may also be displayed in the display area 540 (FIG. 12).

Video Bingo

Figure 15:
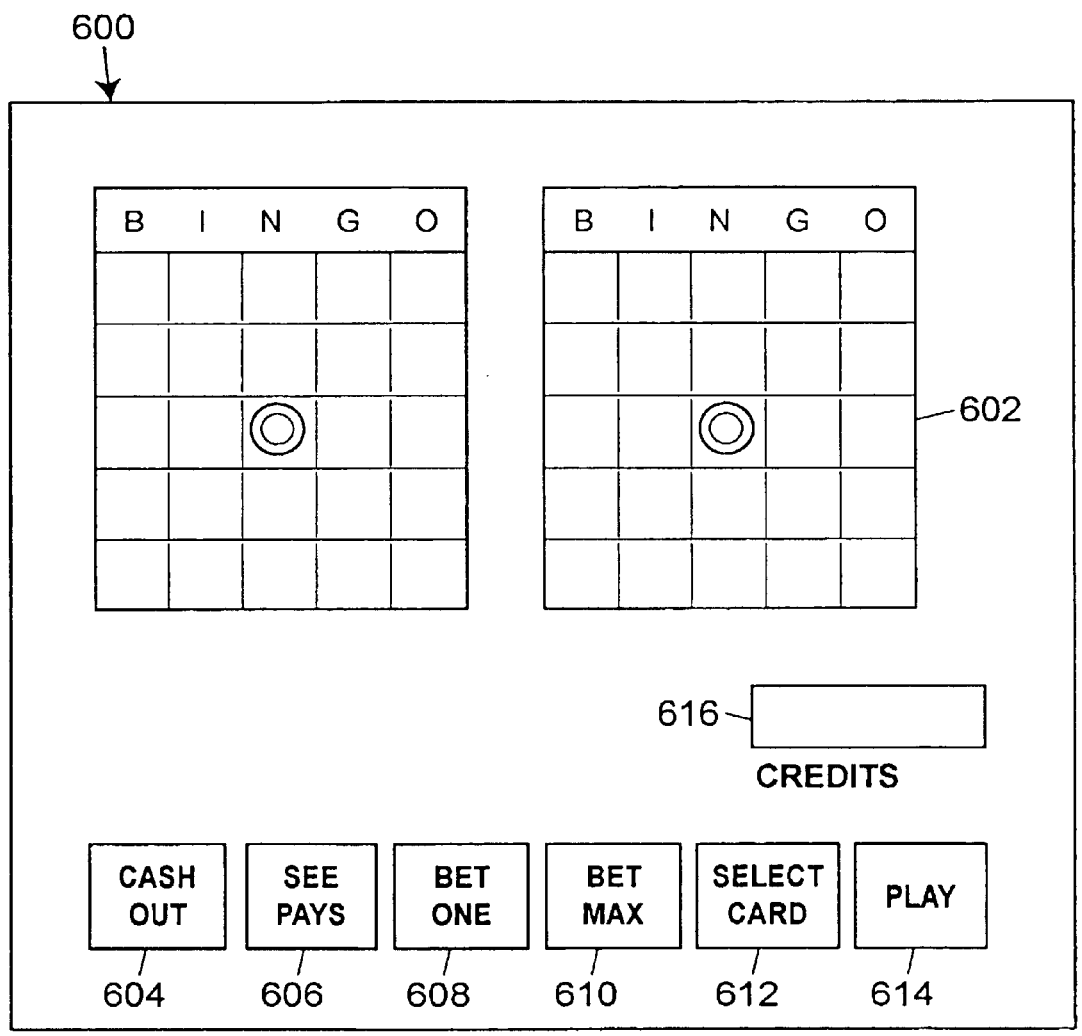
FIG. 15 is an illustration of an embodiment of a visual display that may be displayed during performance of the video bingo routine of FIG. 16.

FIG. 15 is an exemplary display 600 that may be shown on the display unit 70 during performance of the video bingo routine 250 shown schematically in FIG. 4. Referring to FIG. 15, the display 600 may include one or more video images 602 of a bingo card and images of the bingo numbers selected during the game. The bingo card images 602 may have a grid pattern.

To allow the player to control the play of the bingo game, a plurality of player-selectable buttons may be displayed. The buttons may include a "Cash Out" button 604, a "See Pays" button 606, a "Bet One Credit" button 608, a "Bet Max Credits" button 610, a "Select Card" button 612, and a "Play" button 614. The display 600 may also include an area 616 in which the number of remaining credits or value is displayed. If the display unit 70 is provided with a touch-sensitive screen, the buttons may form part of the video display 600. Alternatively, one or more of those buttons may be provided as part of a control panel that is provided separately from the display unit 70.

Figure 16:
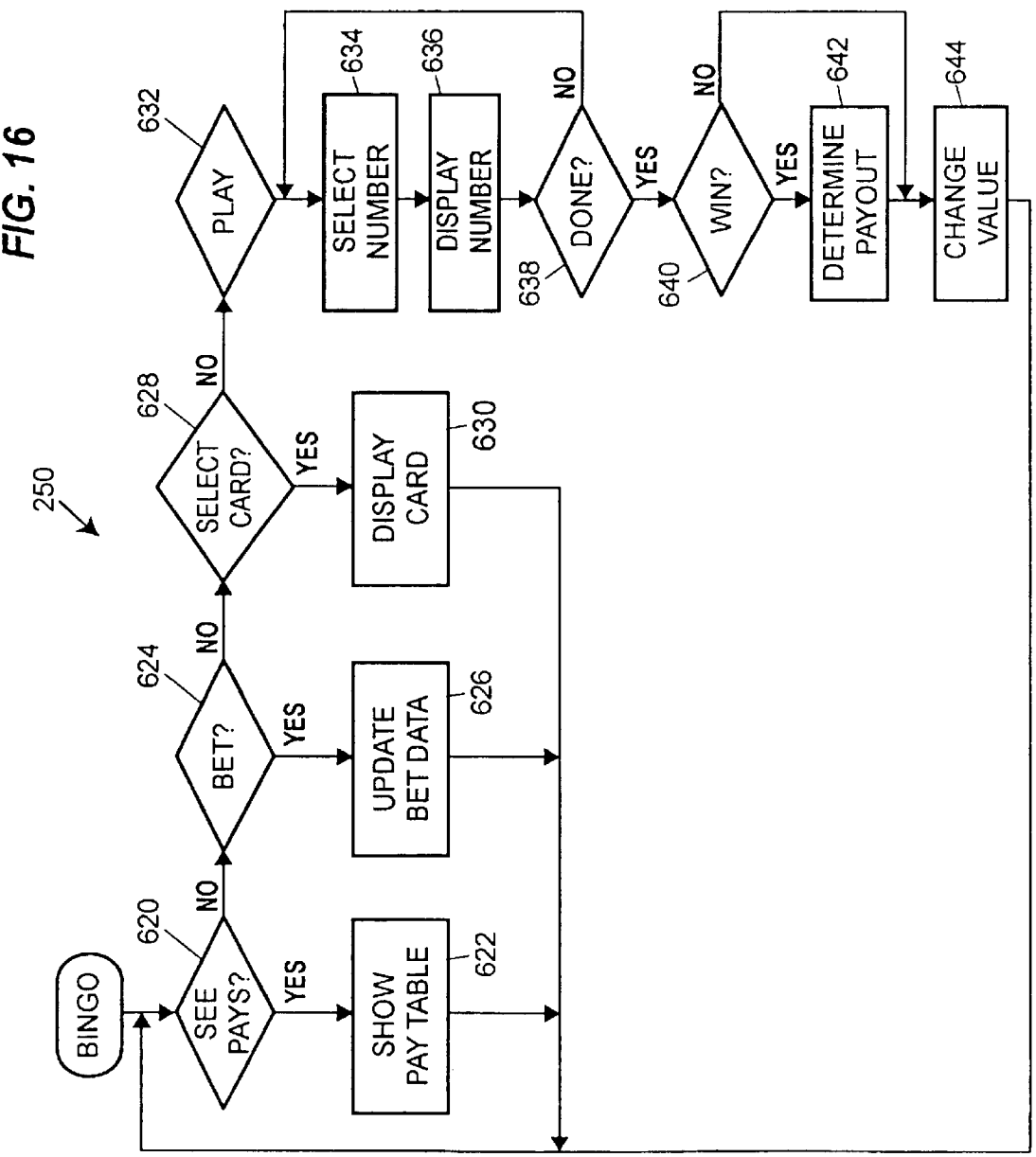
FIG. 16 is a flowchart of an embodiment of a video bingo routine that may be performed by one or more of the gaming units.

FIG. 16 is a flowchart of the video bingo routine 250 shown schematically in FIG. 4. The bingo routine 250 may be utilized in connection with a single gaming unit 20 where a single player is playing a bingo game, or the bingo routine 250 may be utilized in connection with multiple gaming units 20 where multiple players are playing a single bingo game. In the latter case, one or more of the acts described below may be performed either by the controller 100 in each gaming unit 20 or by one of the network computers 22, 32 to which multiple gaming units 20 are operatively connected.

Referring to FIG. 16, at block 620, the routine may determine whether the player has requested payout information, such as by activating the "See Pays" button 606, in which case at block 622 the routine may cause one or more pay tables to be displayed on the display unit 70. At block 624, the routine may determine whether the player has made a bet, such as by having pressed the "Bet One Credit" button 608 or the "Bet Max Credits" button 610, in which case at block 626 bet data corresponding to the bet made by the player may be stored in the memory of the controller 100.

After the player has made a wager, at block 628 the player may select a bingo card, which may be generated randomly. The player may select more than one bingo card, and there may be a maximum number of bingo cards that a player may select. After play is to commence as determined at block 632, at block 634 a bingo number may be randomly generated by the controller 100 or a central computer such as one of the network computers 22, 32. At block 636, the bingo number may be displayed on the display unit 70 and the display units 70 of any other gaming units 20 involved in the bingo game.

At block 638, the controller 100 (or a central computer) may determine whether any player has won the bingo game. If no player has won, another bingo number may be randomly selected at block 634. If any player has bingo as determined at block 638, the routine may determine at block 640 whether the player playing that gaming unit 20 was the winner. If so, at block 642 a payout for the player may be determined. The payout may depend on the number of random numbers that were drawn before there was a winner, the total number of winners (if there was more than one player), and the amount of money that was wagered on the game. At block 644, the player's cumulative value or number of credits may be updated by subtracting the bet made by the player and adding, if the bingo game was won, the payout value determined at block 642. The cumulative value or number of credits may also be displayed in the display area 616 (FIG. 15).

What is claimed is:

1. A payout administration method comprising:
    verifying a location of a gaming apparatus adapted to receive a wager from a player and to provide a payout based on the wager and a game outcome, the gaming apparatus being disposed at a location outside a gaming system operator's property;
    retrieving an electronic form selected according to the location of the gaming apparatus;
    retrieving stored data about the gaming apparatus or the player;
    verifying that the stored data is sufficient to complete the electronic form; and
    combining the electronic form and the stored data to generate a completed electronic form.

2. The payout administration method according to claim 1, additionally comprising retrieving an electronic form selected according to the location of a gaming apparatus if the payout provided exceeds a threshold amount.

3. The payout administration method according to claim 1, additionally comprising retrieving an electronic form from a database comprising a plurality of electronic forms, the electronic form selected according to the location of a gaming apparatus.

4. The payout administration method according to claim 3, wherein the electronic form comprises a tax form.

5. The payout administration method according to claim 1, additionally comprising:
    receiving a player electronic certification of the completed form; and
    combining the player electronic certification and the completed electronic form to generate a certified completed electronic form.

6. The payout administration method of claim 5, additionally comprising:
    receiving a player electronic signature; and
    combining the player electronic signature and the complete electronic form to generate a certified complete electronic form.

7. The payout administration method of claim 1, additionally comprising:
    displaying the completed electronic form; and
    receiving a player verification that the completed electronic form is correct.

8. The payout administration method of claim 1, additionally comprising distributing the completed electronic form to a remote computer disposed at a different geographic location than the gaming apparatus.

9. The payout administration method of claim 8, wherein the remote computer and the gaming apparatus are disposed in a building at different geographic locations.

10. The payout administration method of claim 8, wherein the remote computer is disposed in a different city than the gaming apparatus.

11. The payout administration method of claim 1, wherein the retrieving of an electronic form, the retrieving of stored data, the verifying that the stored data is sufficient, and the combining of the electronic form and the stored data are repeated.

12. A payout administration system comprising:
    a gaming apparatus comprising a display apparatus that is capable of generating video images, a value input device, and a controller operatively coupled to said display apparatus and said value input device, said controller comprising a processor and a memory operatively coupled to said processor,
    said controller being programmed to allow a person to make a wager;
    said controller being programmed to cause a video image to be generated on said display apparatus, said video image representing a game, and
    said controller being programmed to determine, after said video image has been displayed, a value payout associated with an outcome of said game represented by said video image; and
    a computer comprising a processor and a memory operatively coupled to said processor,
    said computer being programmed to verify a location of the gaming apparatus, the gaming apparatus being disposed at a location outside a gaming system operator's property;
    said computer being programmed to retrieve an electronic form selected according to the location of the gaming apparatus,
    said computer being programmed to retrieve stored data about at least one of the player and the gaming apparatus, and
    said computer being programmed to combine the electronic form and the stored data to generate a completed electronic form.

13. The payout administration system according to claim 12, wherein the computer is programmed to retrieve an electronic form selected according to the location of the gaming apparatus if the value payout provided exceeds a threshold amount.

14. The payout administration system according to claim 12, wherein the computer is programmed to retrieve an electronic form from a database comprising a plurality of electronic forms, the electronic form selected according to the location of the gaming apparatus.

15. The payout administration system according to claim 14, wherein the electronic form comprises a tax form.

16. The payout administration system according to claim 12, wherein:
    the computer is programmed to display the completed electronic form; and
    the computer is programmed to receive a player verification that the completed electronic form is correct.

17. The payout administration system according to claim 12, wherein:
    the computer is programmed to receive a player electronic certification of the completed form; and
    the computer is programmed to combine the player electronic certification and the completed electronic form to generate a certified completed electronic form.

18. The payout administration system according to claim 17, wherein:
    the computer is programmed to receive a player electronic signature; and
    the computer is programmed to combine the player electronic signature and the complete electronic form to generate a certified complete electronic form.

19. The payout administration system according to claim 12, wherein the computer is programmed to distribute the completed electronic form to a remote computer disposed at a different geographic location than the gaming apparatus.

20. The payout administration method of claim 19, wherein the remote computer and the gaming apparatus are disposed in a building at different geographic locations.

21. The payout administration method of claim 19, wherein the remote computer is disposed in a different city than the gaming apparatus.

22. The payout administration system according to claim 21, wherein the computer is programmed to repeat the retrieving of an electronic form, the retrieving of stored data, the verifying that the stored data is sufficient, and the combining of the electronic form and the stored data.

23. The payout administration system according to claim 12, wherein the computer is operatively coupled to the gaming apparatus by a data link.

24. The payout administration system according to claim 23, wherein the computer comprises a Personal Digital Assistant.

25. The payout administration system according to claim 12, wherein the computer is operatively coupled to the gaming apparatus by a network.

26. The payout administration system according to claim 25, wherein the network is selected from the group of networks consisting of a local area network, a wide area network, an intranet and the Internet.

* * * * *